430-546 SR
9/2/86 OR H 000,122

United States Statutory Invention Registration [19]

[11] Reg. Number: H122

Kawagashi et al. [45] Published: Sep. 2, 1986

[54] SILVER HALIDE COLOR PHOTOGRAPHIC LIGHT-SENSITIVE MATERIAL

[75] Inventors: Toshio Kawagishi; Kiyoshi Nakazyo; Masakazu Morigaki, all of Kanagawa, Japan

[73] Assignee: Fuji Photo Film Co., Ltd., Minami-ashigara, Japan

[21] Appl. No.: 756,617

[22] Filed: Jul. 19, 1985

[30] Foreign Application Priority Data

Jul. 19, 1984 [JP] Japan ..... 59-150263

[51] Int. Cl.[4] ..... G03C 7/34; G03C 7/32; G03C 7/26; G03C 1/26

[52] U.S. Cl. ..... 430/546; 430/548; 430/558

[58] Field of Search ..... 430/546, 558, 548

[56] References Cited

U.S. PATENT DOCUMENTS

| | | | |
|---|---|---|---|
| 2,322,027 | 6/1943 | Jelley et al. | 430/546 |
| 3,061,432 | 10/1962 | Menzel et al. | 430/376 |
| 3,676,137 | 7/1972 | Mizuki et al. | 430/546 |
| 3,725,067 | 4/1973 | Bailey et al. | 430/558 |
| 4,278,757 | 7/1981 | Mukunoki et al. | 430/546 |
| 4,430,422 | 2/1984 | Van de Sande et al. | 430/546 |
| 4,500,630 | 2/1985 | Sato et al. | 430/476 |

*Primary Examiner*—John F. Terapane
*Assistant Examiner*—Jack Thomas
*Attorney, Agent, or Firm*—Sughrue, Mion, Zinn, Macpeak and Seas

[57] ABSTRACT

A silver halide color photographic light-sensitive material which comprises a support having thereon at least one silver halide emulsion layer containing dispersed therein at least one magenta coupler represented by the following general formula (I):

(I)

wherein $R^1$ and $R^2$, which may be the same or different, each represents a hydrogen atom or a substituent, X represents a hydrogen atom or a group capable of being eliminated upon coupling with an oxidation product of an aromatic primary amine developing agent, Z represents a nitrogen atom or —$CR^6$ where $R^6$ represents a hydrogen atom or a substituent and dimers or higher polymers thereof, together with at least one high boiling organic solvent represented by the following general formula (II):

(II)

wherein $R^3$, $R^4$ and $R^5$, which may be the same or different, each represents an alkyl group, a cycloalkyl group, an alkenyl group or an aryl group, provided that the total number of carbon atoms contained in the groups represented by $R^3$, $R^4$ and $R^5$ is 12 to 60.

20 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE COLOR PHOTOGRAPHIC LIGHT-SENSITIVE MATERIAL

FIELD OF THE INVENTION

This invention relates to a silver halide color photographic light-sensitive material and, more particularly, to a silyer halide color photographic light-sensitive material having improved color reproducibility and color image fastness.

BACKGROUND OF THE INVENTION

In silver halide color photographic light-sensitive materials, silver halide emulsions and so-called dye forming couplers (hereinafter merely referred to as couplers) capable of reacting with an oxidation product of an aromatic primary amine developing agent are often employed. In particular, a combination of a yellow coupler, a cyan coupler and a magenta coupler is usually employed in color photographic light-sensitive materials.

Of these, 5-pyrazolone type couplers widely used as magenta couplers have serious problems in color reproduction, since they show a side absorption around 430 nm and show a poor toe cut of absorption on the longer wavelength side.

In order to solve these problems, pyrazoloazole type magenta couplers have been developed. Magenta dyes obtained by coupling this type of coupler with an oxidation product of an aromatic primary amine developing agent do not have a side absorption around 430 nm as an ethyl acetate solution, and provide a very pure magenta color with a good toe cut of absorption on the longer wavelength side.

However, problems exist with these couplers in that the images formed on film or photographic printing paper by imagewise exposure and color developing light-sensitive materials which have silver halide emulsion layers containing these pyrazoloazole type magenta couplers dispersed therein using a high boiling organic solvent do not necessarily exhibit a good toe cut on the longer wavelength side in the reflection absorption spectrum. Further, these couplers fail to sufficiently improve color reproducibility, and possess only insufficient color image light fastness.

SUMMARY OF THE INVENTION

An object of the present invention is to provide a silver halide color photographic light-sensitive material having an improved color reproducibility which is attained by forming a magenta color image with a good hue and a sharp toe cut of absorption on the longer wavelength side using a pyrazoloazole type coupler.

Another object of the present invention is to provide a silver halide color photographic light-sensitive material having an improved color image fastness using a pyrazoloazole coupler.

These and other objects of the present invention will become apparent from the following description thereof.

The above-described and other objects of the present invention are attained by a silver halide color photographic light-sensitive material which comprises a support having thereon at least one silver halide emulsion layer containing dispersed therein at least one magenta coupler represented by the following general formula (I):

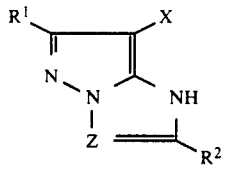

(I)

wherein $R^1$ and $R^2$, which may be the same or different, each represents a hydrogen atom or a substituent, X represents a hydrogen atom or a group capable of being eliminated on coupling with an oxidation product of an aromatic primary amine developing agent, Z represents a nitrogen atom or $-CR^6$ where $R^6$ represents a hydrogen atom or a substituent, and the coupler may form a dimer or higher polymer at $R^1$, $R^2$, $R^6$ or X together with at least one high boiling organic solvent represented by the following general formula (II):

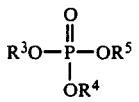

(II)

wherein $R^3$, $R^4$ and $R^5$, which may be the same or different, each represents an alkyl group, a cycloalkyl group, an alkenyl group or an aryl group, provided that the total number of carbon atoms contained in the groups represented by $R^3$, $R^4$ and $R^5$ is 12 to 60.

BRIEF DESCRIPTION OF THE DRAWINGS

In FIG. 1, the absorption spectrum for Comparative Example 2 almost overlaps that of Comparative Example 3 on the shorter wavelength side with respect to the absorption maximum. In FIG. 2, A, B and D almost overlap one another on the shorter wavelength side with respect to the absorption maximum.

DETAILED DESCRIPTION OF THE INVENTION

Figure 1:
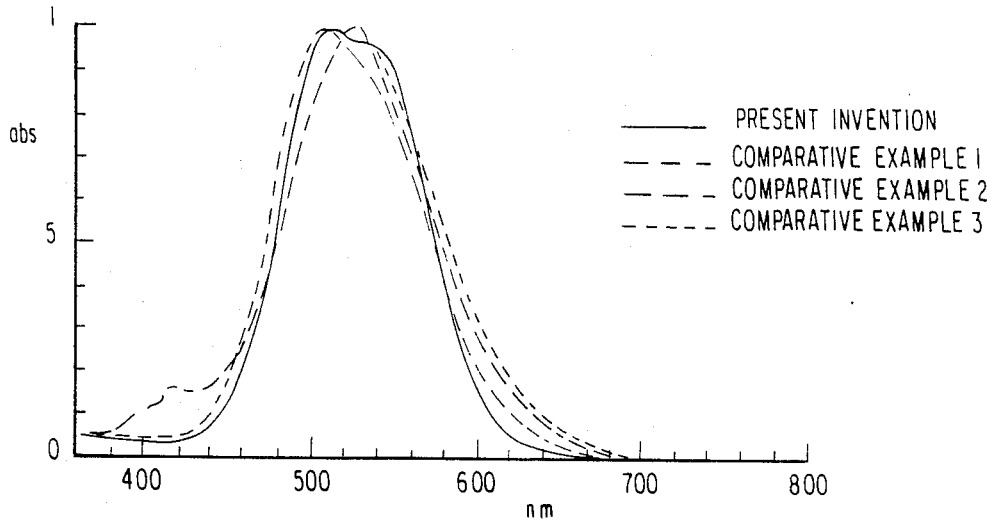
FIGS. 1 and 2 show absorption spectra of magenta color dyes.

In the general formula (I), the term "a dimer or a higher polymer" means two or more groups represented by the general formula (I) are present in each molecule, including bis derivatives and polymer couplers. The polymer couplers may be homopolymers comprising one or more monomers having the moiety represented by the general formula (I) (preferably having an ethylenically unsaturated group) or may be copolymers of at least one such monomer with at least one ethylenically unsaturated monomer which does not couple with an oxidation product of an aromatic primary amine developing agent and, therefore, does not form a color dye.

Examples of compounds, represented by the general formula (I) include 1H-imidazo[1,2-b]pyrazoles and 1H-pyrazolo[1,5-b][1,2,4]triazoles, which are respectively represented by the following general formulae (III) and (IV). Of these, those compounds which are represented by the general formula (IV) are particularly preferable.

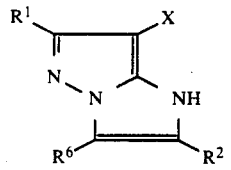

(III)

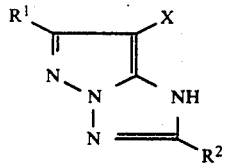

(IV)

$R^1$, $R^2$ and $R^6$ in the general formulae (III) and (IV), which can be the same or different, each represents a hydrogen atom or a substituent. The substituent includes a halogen atom, an alkyl group, an aryl group, a heterocyclic group, a cyano group, an alkoxy group, an aryloxy group, a heterocyclic oxy group, an acyloxy group, a carbamoyloxy group, a silyloxy group, a sulfonyloxy group, an acylamino group, an anilino group, a ureido group, an imido group, a sulfamoylamino group, a carbamoylamino group, an alkylthio group, an arylthio group, a heterocyclic thio group, an alkoxycarbonylamino group, an aryloxycarbonylamino group, a sulfonamido group, a carbamoyl group, an acyl group, a sulfamoyl group, a sulfonyl group, a sulfinyl group, an alkoxycarbonyl group and an aryloxycarbonyl group. X represents a hydrogen atom or a group capable of being eliminated upon coupling with an aromatic primary amine developing agent which includes a halogen atom, a carboxy group, or an another coupling-off group bound to the carbon atom in the coupling position through an oxygen atom, a nitrogen atom or a sulfur atom.

$R^1$, $R^2$, $R^6$ or X also may be a divalent group to form a bis derivative. In addition, where the moiety represented by the general formula (III) or (IV) exists in a vinyl monomer, $R^1$, $R^2$ or $R^6$ represents a bond or a linking group through which the moiety represented by the general formula (III) or (IV) and an ethylenically unsaturated group are bound to each other.

More particularly, $R^1$, $R^2$ and $R^6$ each represents a hydrogen atom, a halogen atom (e.g., a chlorine atom, a bromine atom, etc.), an alkyl group (e.g., a methyl group, a propyl group, a, t-butyl group, a trifluoromethyl group, a tridecyl group, a 3-(2,4-di-t-amylphenoxy)propyl group, a 2-dodecyloxyethyl group, a 3-phenoxypropyl group, a 2-hexylsulfonylethyl group, a cyclopentyl group, a benzyl group, etc.), an aryl group (e.g., a phenyl group, a 4-t-butylphenyl group, a 2,4-di-t-amylphenyl group, a 4-tetradecanamidophenyl group, etc.), a heterocyclic group (e.g., a 2-furyl group, a 2-thienyl group, a 2-pyrimidinyl group, a 2-benzothiazolyl group, etc.), a cyano group, an alkoxy group (e.g., a methoxy group, an ethoxy group, a 2-methoxyethoxy group, a 2-dodecyloxyethoxy group, a 2-methanesulfonylethoxy group, etc.), an aryloxy group (e.g., a phenoxy group, a 2-methylphenoxy group, a 4-t-butylphenoxy group, etc ), a heterocyclic oxy group (e.g., a 2-benzimidazolyloxy group, etc.), an acyloxy group (e.g., an acetoxy group, a hexadecanoyloxy group, etc.), a carbamoyloxy group (e.g., an N-phenylcarbamoyloxy group, an N-ethylcarbamoyloxy group, etc.), a silyloxy group (e.g., a trimethylsilyloxy group, etc.), a sulfonyloxy group (e.g., a dodecylsulfonyloxy group, etc.), an acylamino group (e.g., an acetamido group, a benzamido group, a tetradecanamido group, an α-(2,4-di-t-amylphenoxy-)-butyramido group, a γ-(3-t-butyl-4-hydroxyphenoxy)-butyramido group, an α-[4-(4-hydroxyphenylsulfonyl)-phenoxy]decanamido group, etc.), an anilino group (e.g., a phenylamino group, a 2-chloroanilino group, a 2-chloro-5-tetradecanamidoanilino group, a 2-chloro-5-dodecyloxycarbonylanilino group, an N-acetylanilino group, a 2-chloro-5-[α-(3-t-butyl-4-hydroxyphenoxy)-dodecanamido]-anilino group, etc.), a ureido group (e.g., a phenylureido group, a methylureido group, an N,N-dibutylureido group, etc.), an imido group (e.g., an N-succinimido group, a 3-benzylhydantoinyl group, a 4-(2-ethylhexanoylamino)phthalimido group, etc.), a sulfamoylamino group (e.g., an N,N-dipropylsulfamoyl group, an N-methyl-N-decylsulfamoylamino group, etc.), an alkylthio group (e.g., a methylthio group, an octylthio group, a tetradecylthio group, a 2-phenoxyethylthio group, a 3-phenoxypropylthio group, a 3-(4-t-butylphenoxy)propylthio group, etc.), an arylthio group (e.g., a phenylthio group, a 2-butoxy-5-t-octylphenylthio group, a 3-pentadecylphenylthio group, a 2-carboxyphenylthio group, a 4-tetradecanamidophenylthio group, etc.), a heterocyclic thio group (e.g., a 2-benzothiazolylthio group, etc.), an alkoxycarbonylamino group (e.g., a methoxycarbonylamino group, a tetradecyloxycarbonylamino group, etc.), an aryloxycarbonylamino group (e.g., a phenoxycarbonylamino group, a 2,4-di-tert-butylphenoxycarbonylamino group, etc.), a sulfonamido group (e.g., a methanesulfonamido group, a hexadecanesulfonamido group, a benzenesulfonamido group, a p-toluenesulfonamido group, an octadecanesulfonamido group, a 2-methyloxy-5-t-butylbenzenesulfonamido group, etc.), a carbamoyl group (e.g., an N-ethylcarbamoyl group, an N,N-dibutylcarbamoyl group, an N-(2-dodecyloxyethyl)-carbamoyl group, an N-methyl-N-dodecylcarbamoyl group, an N-[3-(2,4-di-tert-amylphenoxy)-propyl]carbamoyl group, etc.), an acyl group (e.g., an acetyl group, a (2,4-di-tert-amylphenoxy)acetyl group, a benzoyl group, etc.), a sulfamoyl group (e.g., an N-ethylsulfamoyl group, an N,N-dipropylsulfamoyl group, an N-(2-dodecyloxyethyl)-sulfamoyl group, an N-ethyl-N-dodecylsulfamoyl group, an N,N-diethylsulfamoyl group, etc.), a sulfonyl group (e.g., a methanesulfonyl group, an octanesulfonyl group, a benzenesulfonyl group, a toluenesulfonyl group, etc.), a sulfinyl group (e.g., an octanesulfinyl group, a dodecylsulfinyl group, a phenylsulfinyl group, etc.), an alkoxycarbonyl group (e.g., a methoxycarbonyl group, a butyloxycarbonyl group, a dodecylcarbonyl group, an octadecylcarbonyl group, etc.) or an aryloxycarbonyl group (e.g., a phenyloxycarbonyl group, a 3-pentadecyloxycarbonyl group, etc.), and X represents a hydrogen atom, a halogen atom (e.g., a chlorine atom, a bromine atom, an iodine atom, etc.), a carboxyl group, a group bound via an oxygen atom (e.g., an acetoxy group, a propanoyloxy group, a benzoyloxy group, a 2,4-dichlorobenzoyloxy group, an ethoxyoxaloyloxy group, a pyruvinyloxy group, a cinnamoyloxy group, a phenoxy group, a 4-cyanophenoxy group, a 4-methanesulfonamidophenoxy group, a 4-methanesulfonylphenoxy group, an α-naphthoxy group, a 3-pentadecylphenoxy group, a benzyloxycarbonyloxy group, an ethoxy group, a 2-cyanoethoxy group, a benzyloxy group, a 2-phenethyloxy group, a 2-phenoxyethoxy group, a 5-phenyltetrazolyloxy group, a 2-benzothiazolyloxy group, etc.), a group bound via a nitrogen atom (e.g., a benzenesulfonamido group, an N-ethyltoluenesulfonamido group, a heptafluorobutanamido group, a 2,3,4,5,6-pentafluorobenzamido group, an octanesulfonamido group, a p-cyanophenylureido group, an N,N-diethylsulfamoylamino group, a 1-piperidyl group, a 5,5-dimethyl-2,4-dioxo-3-oxazolidinyl group, a 1-benzylethoxy-3-hydantoinyl group, a 2N-1,1-dioxo-3(2H)-oxo-1,2-benzoisothiazolyl group, a 2-oxo-1,2-dihydro-1-pyridinyl group, an imidazolyl group, a pyrazolyl group, a 3,5-diethyl-1,2,4-triazol-1-yl group, a 5- or 6-bromobenzotriazol-1-yl group, a 5-methyl-1,2,3,4-triazol-1-yl group, a benzimidazolyl group, a 3-benzyl-1-hydantoinyl group, a 1-benzyl-5-hexadecyloxy-3-hydantoinyl group, a 5-methyl-1-tetrazolyl group, a 4-methoxyphenylazo group, a 4-pivaloylaminophenylazo group, a 2-hydroxy-4-propanoylphenylazo group, etc.), or a group bound via a sulfur atom (e.g., a phenylthio group, a 2-carboxyphenylthio group, a 2-methoxy-5-t-octylphenylthio group, a 4-methanesulfonylphenylthio group, a 4-octanesulfonamidophenylthio group, a 2-butoxyphenylthio group, a 2-(2-hexanesulfonylethyl)-5-tertoctylphenylthio group, a benzylthio group, a 2-cyanoethylthio group, a 1-ethoxycarbonyltridecylthio group, a 5-phenyl-2,3,4,5-tetrazolylthio group, a 2-benzothiazolylthio group, a 2-dodecylthio-5-thiophenylthio group, a 2-phenyl-3-dodecyl-1,2,4-triazolyl-5-thio group, etc.).

Where $R^1$, $R^2$, $R^6$ or X represents a divalent group to form a bis derivative, such divalent group includes a substituted or unsubstituted alkylene group (e.g., a methylene group, an ethylene group, a 1,10-decylene group, $-CH_2CH_2-O-CH_2CH_2-$, etc.), a substituted or unsubstituted phenylene group (e.g., a 1,4-phenylene group, a 1,3-phenylene group

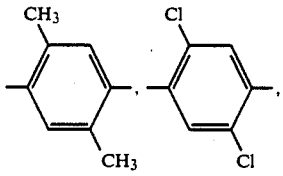

(etc.), or $-NHCO-R_7-CONH-$ (wherein $R_7$ represents a substituted or unsubstituted alkylene or phenylene group).

Where the moiety represented by the general formula (III) or (IV) exists in a vinyl monomer, the linking group represented by $R^1$, $R^2$ or $R^6$ includes an alkylene group (a substituted or unsubstituted alkylene group, e.g., a methylene group, an ethylene group, a 1,10-decylene group, $-CH_2CH_2OCH_2CH_2-$, etc.), a phenylene group (a substituted or unsubstituted phenylene group, e.g., a 1,4-phenylene group, a 1,3-phenylene group

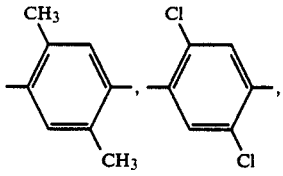

(etc.), -NHCO-, -CONH-, -O-, -OCO-, or an aralkylene group (e.g.,

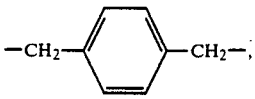

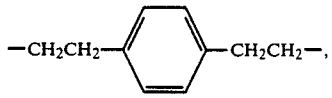

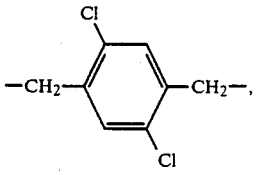

(etc.) alone or in combination thereof.

Additionally, the ethylenically unsaturated group in the vinyl monomer includes those which have other substituents than are represented by the general formulae (III) and (IV). Preferred substituents are a hydrogen atom, a chlorine atom or a lower alkyl group containing 1 to 4 carbon atoms.

Illustrative examples of ethylenically unsaturated monomers which do not couple with an oxidation product of an aromatic primary amine developing agent and therefore do not form a color dye include acrylic acid, α-chloroacrylic acid, α-alacrylic acids (e.g., methacrylic acid, etc.), esters or amides derived from these acrylic acids (e.g., acrylamide, n-butylacrylamide, t-butylacrylamide, diacetoneacrylamide, methacrylamide, methyl acrylate, ethyl acrylate, n-propyl acrylate, n-butyl acrylate, t-butyl acrylate, isobutyl acrylate, 2-ethylhexyl acrylate, n-octyl acrylate, lautyl acrylate, methyl methacrylate, ethyl methacrylate, n-butyl methacrylate and β-hydroxymethacrylate), methylenedibisacrylamide, vinyl esters (e.g., vinyl acetate, vinyl propionate and vinyl laurate), acrylonitrile, methacrylonitrile, aromatic vinyl compounds (e.g., styrene and its derivatives, vinyltoluene, divinylbenzene, vinylacetophenone and sulfostyrene), itaconic acid, citraconic acid, crotonic acid, vinylidene chloride, vinyl alkyl ethers (e.g., vinyl ethyl ether), maleic acid, maleic anhydride, maleic esters, N-vinyl-2-pyrrolidone, N-vinylpyridine and 2- and 4-vinylpyridine, etc. Two or more of these non-color-forming ethylenically unsaturated monomers described above may be used in combination.

Examples of and processes for the synthesis of couplers represented by the above general formula (III) or (IV) are described in the literature: e.g., compounds of the general formula (III) are described in Japanese Patent Application (OPI) No. 162548/84 (corresponding to U.S. Pat. No. 4,500,630) (the term "OPI" as used herein refers to a "published unexamined Japanese patent application"), and compounds of the general formula (IV) in Japanese Patent Application (OPI) No. 171956/84 (corresponding to European Patent No. 119,860A) and U.S. Patent Application Ser. No. 713,989 (filed on Mar. 20, 1985). U.S. Pat. Nos. 3,061,432 and 3,725,067 disclose both compounds of the general formulae (III) and (IV).

Specific examples of couplers represented by the general formula (III) or (IV) are illustrated below. However, the present invention is not to be construed as being limited at all to the couplers set forth below.

(M-1)
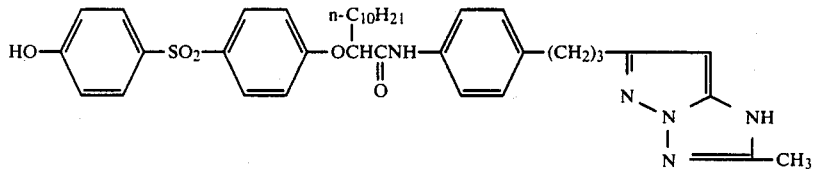
(M-2)
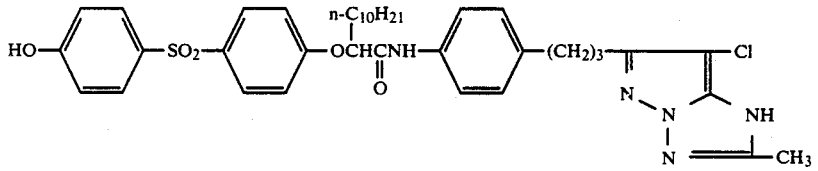
(M-3)
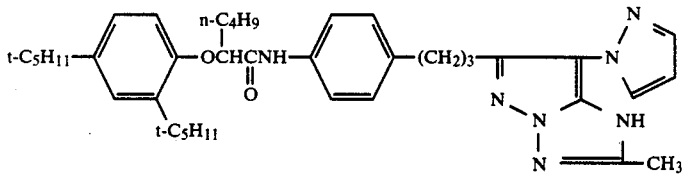
(M-4)
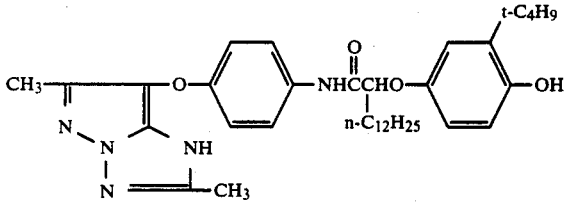
(M-5)
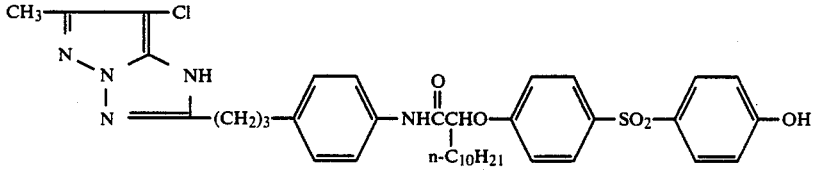
(M-6)
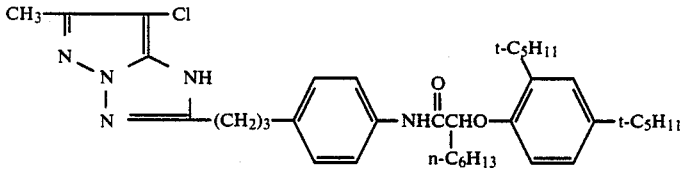
(M-7)
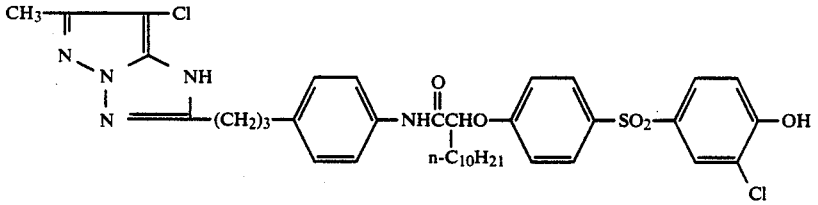
(M-8)
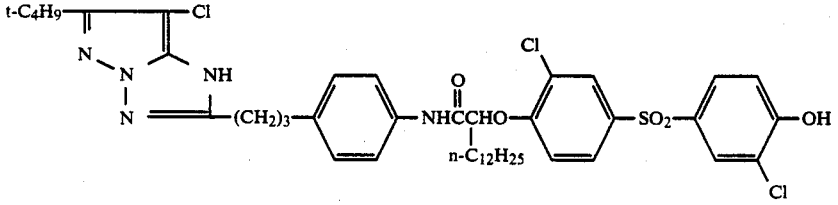

-continued
(M-9)
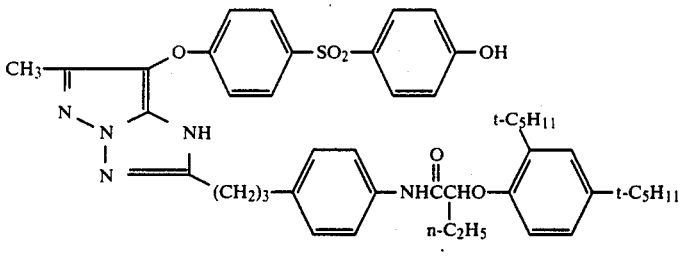
(M-10)
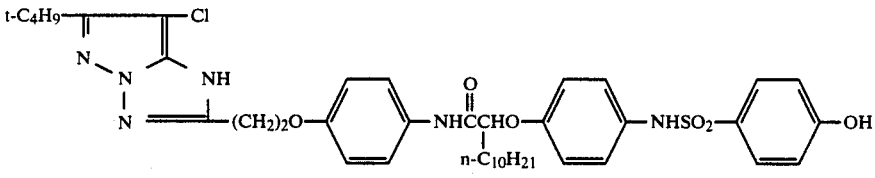
(M-11)
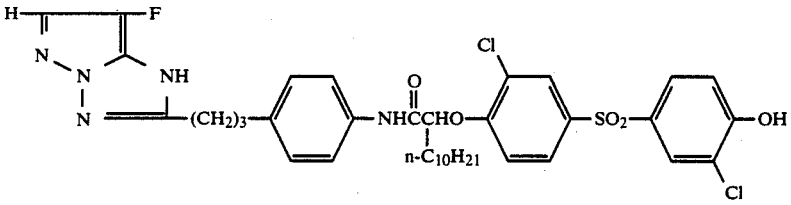
(M-12)
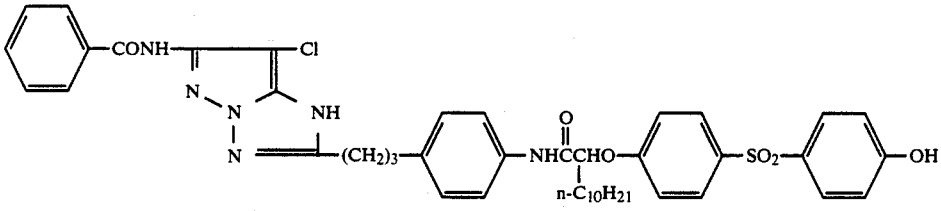
(M-13)
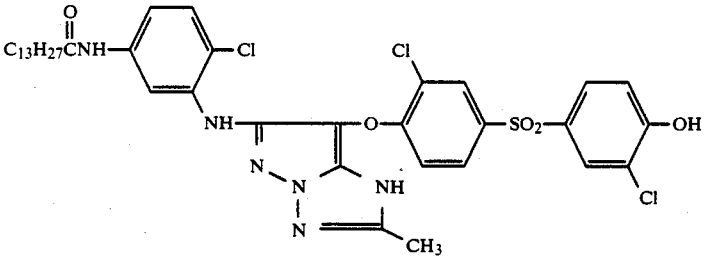
(M-14)
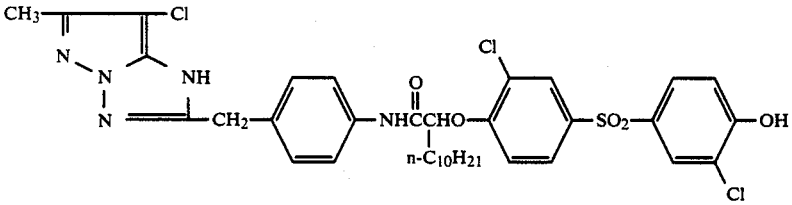
(M-15)
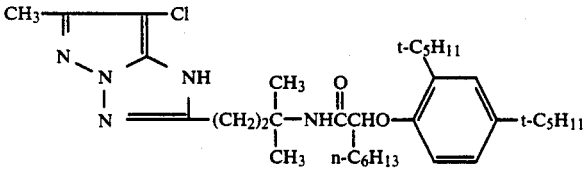

-continued
(M-16)
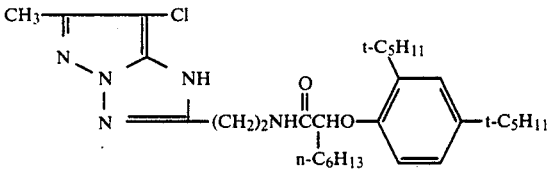
(M-17)
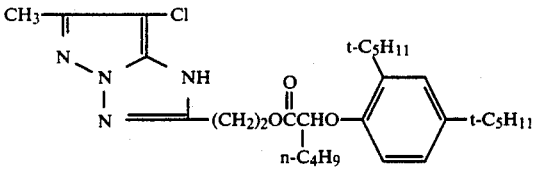
(M-18)
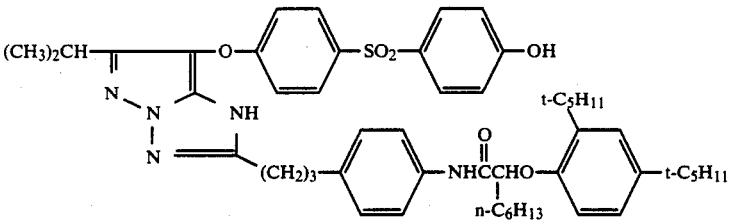
(M-19)
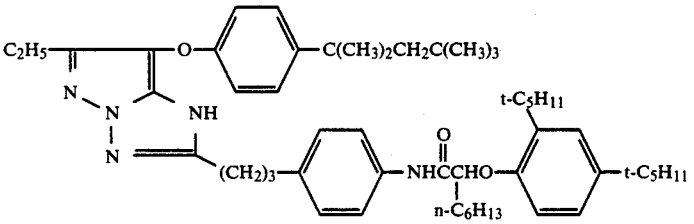
(M-20)
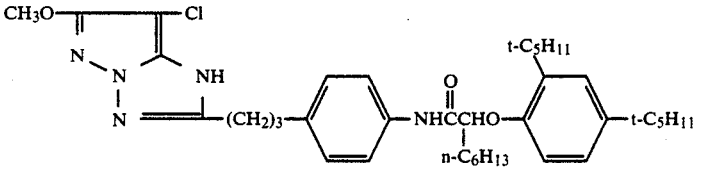
(M-21)
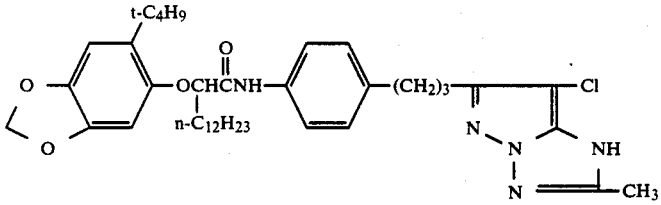
(M-22)
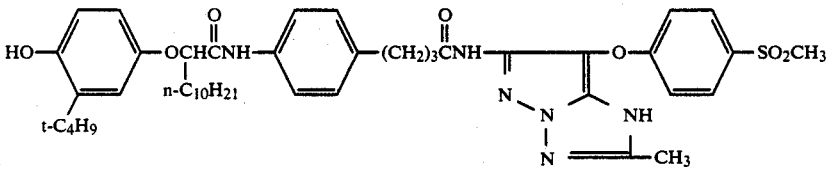
(M-23)
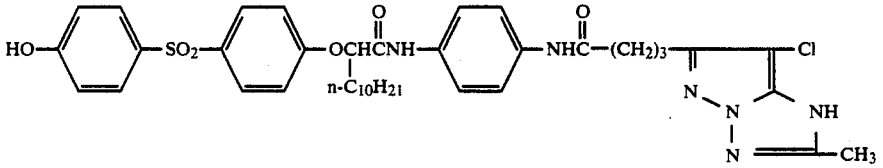

-continued
(M-24)
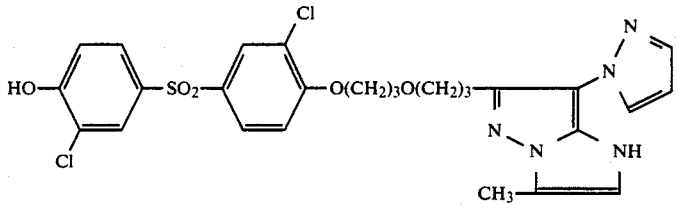
(M-25)
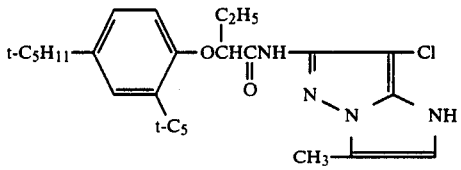
(M-26)
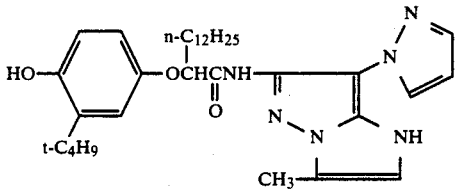
(M-27)
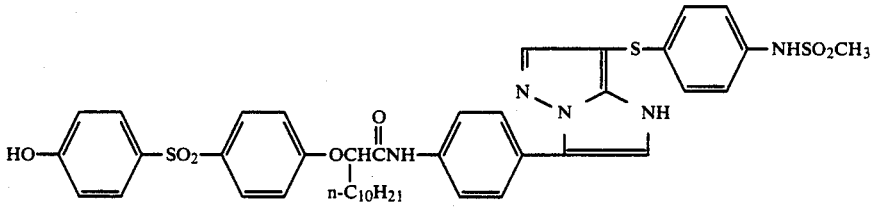
(M-28)
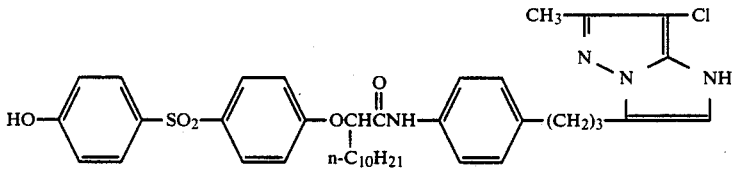
(M-29)
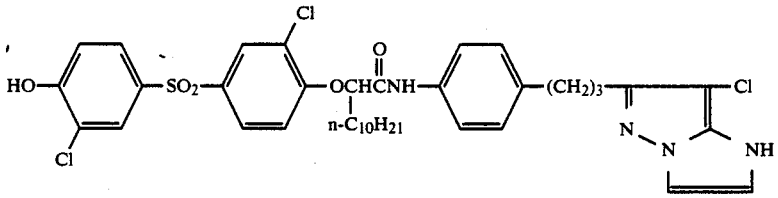
(M-30)
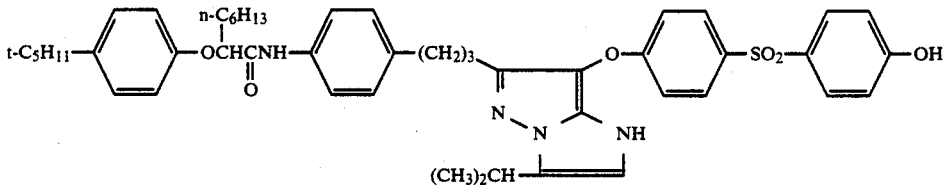

-continued
(M-31)
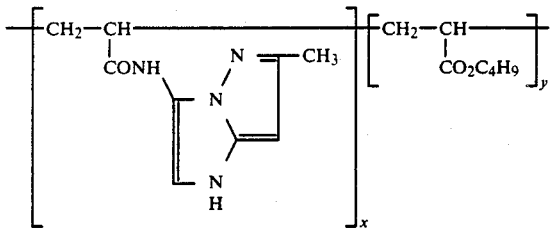
x:y = 50:50
(by weight, hereinafter the same)
(M-32)
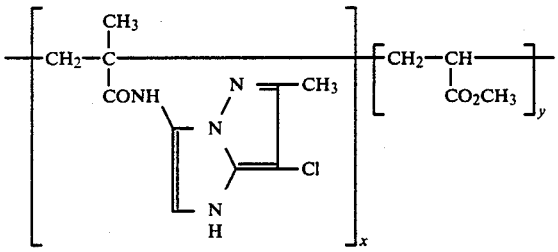
x:y = 40:60
(M-33)
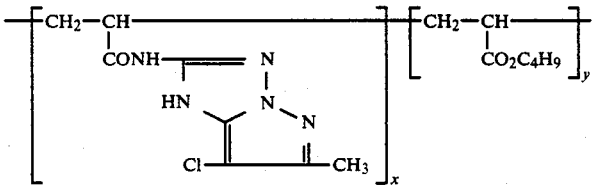
x:y = 50:50
(M-34)
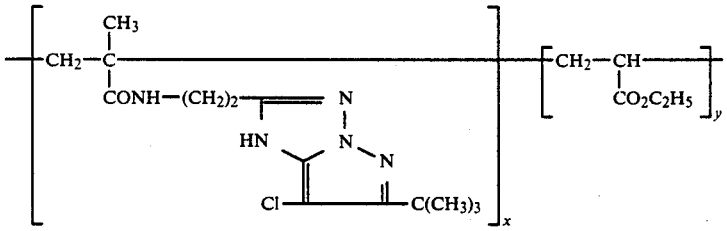
x:y = 55:45
(M-35)
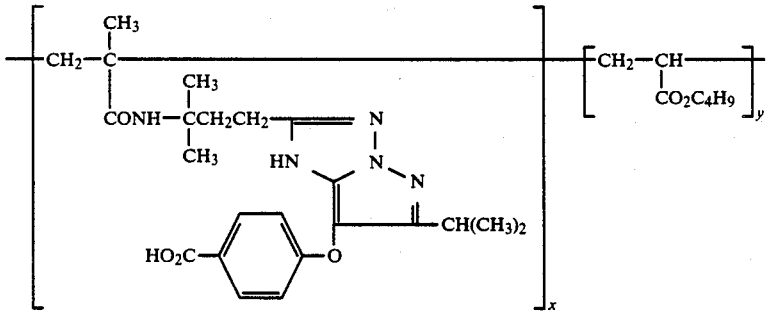
x:y = 50:50

-continued
(M-36)
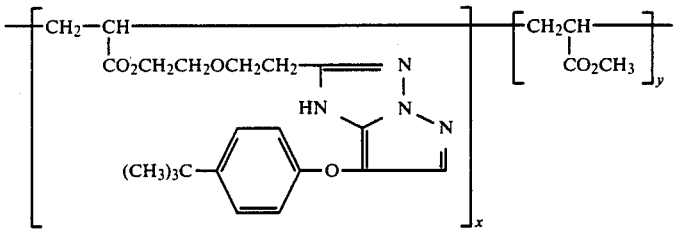
x:y = 45:55
(M-37)
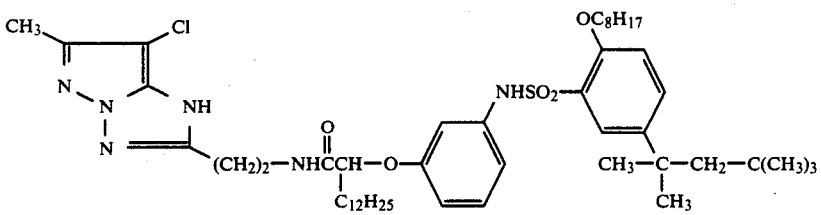
(M-38)
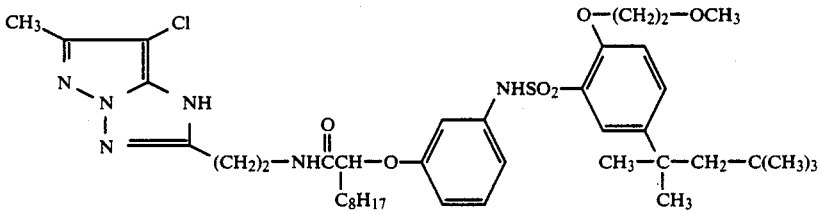
(M-39)
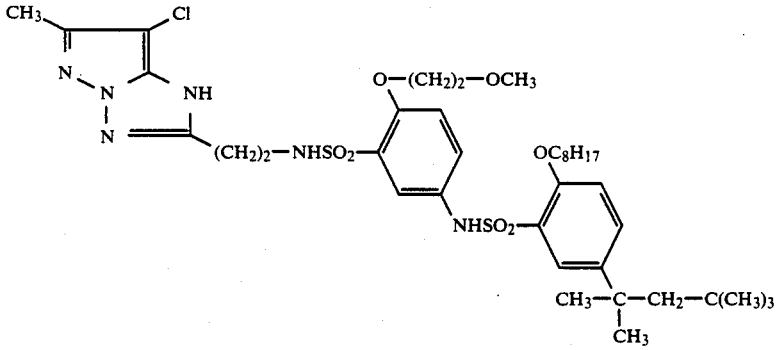
(M-40)
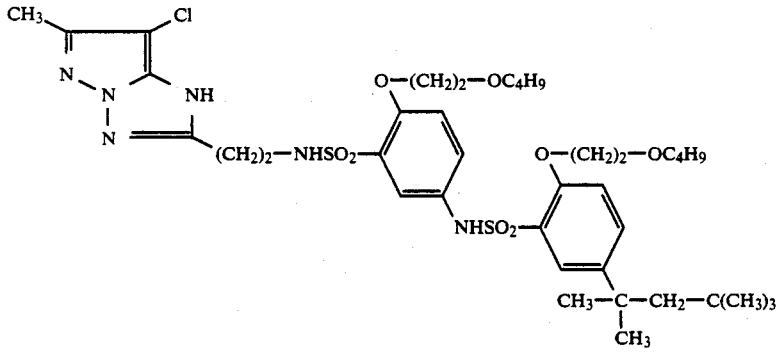

-continued
(M-41)
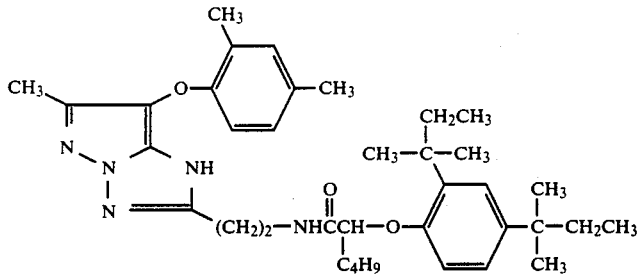
(M-42)
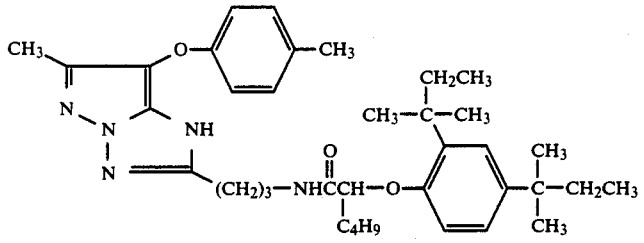
(M-43)
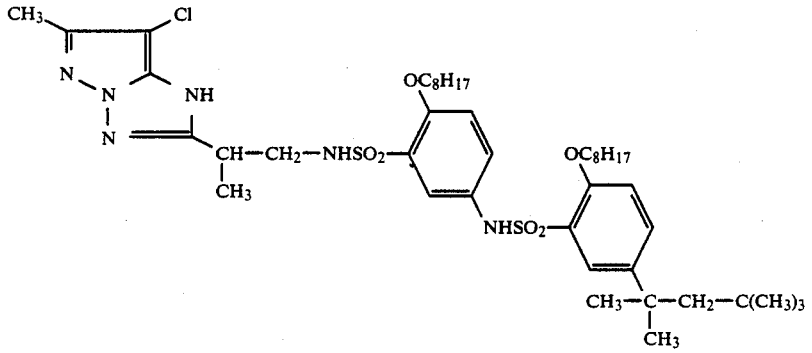
(M-44)
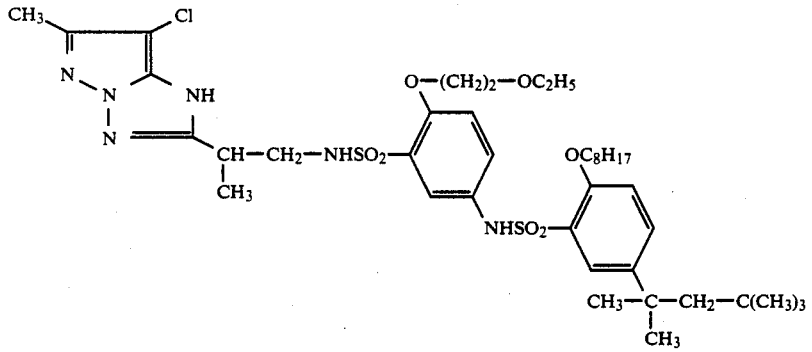
(M-45)
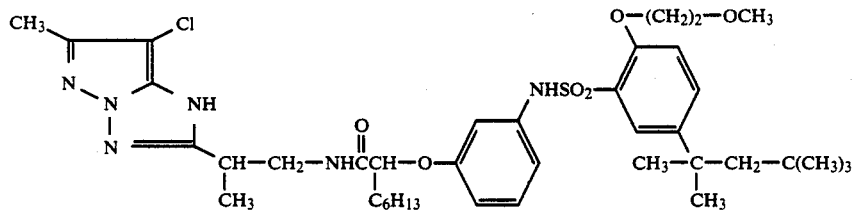

-continued
(M-46)
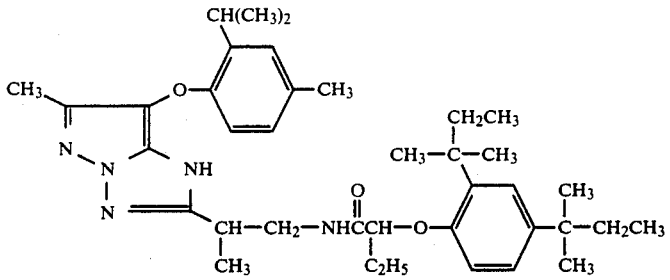
(M-47)
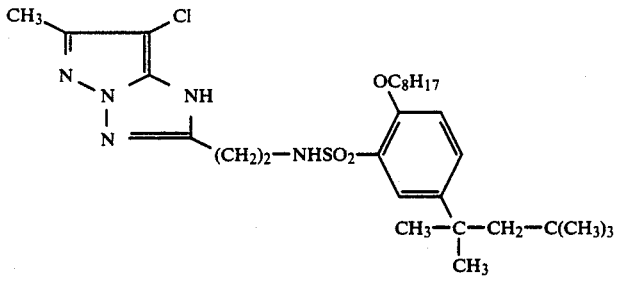
(M-48)
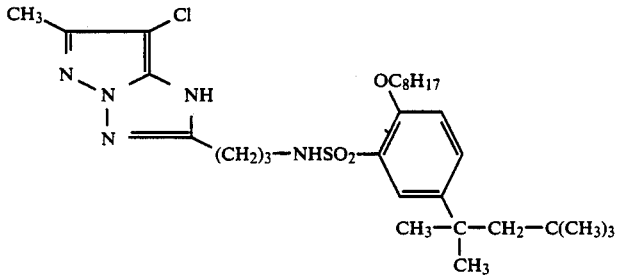
(M-49)
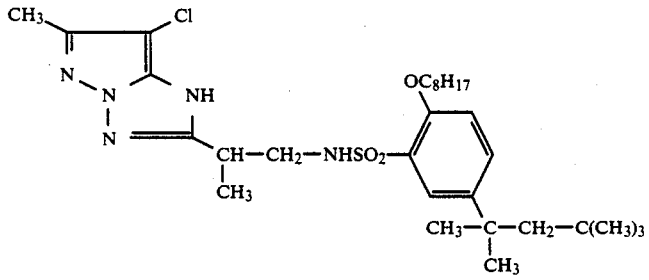
(M-50)
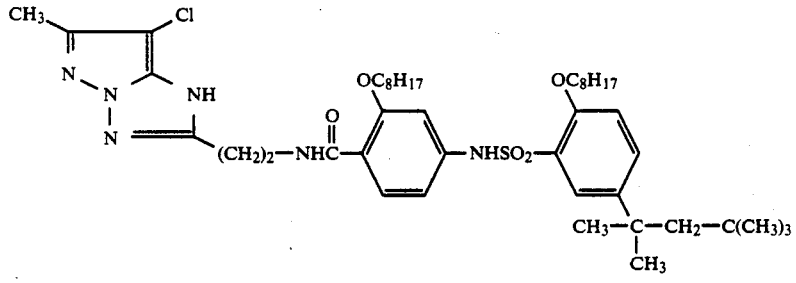

-continued (M-51)

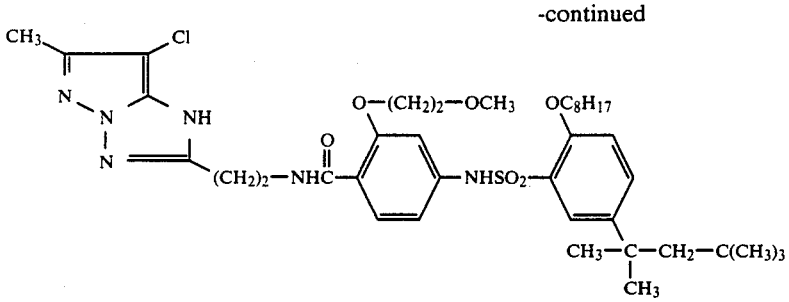

The reason for limiting the total number of carbon atoms of the substituents represented by $R^3$, $R^4$ and $R^5$ in the general formula (II) to 12 to 60 is that the improved effects of the present invention are reduced when the total is outside this range. In addition, if the total number of carbon atoms exceeds 60, the solubility of coupler is so reduced that, in some cases, the coupler forms a precipitate, thus the total number of carbon atoms of more than 60 is not preferable.

In the general formula (II), the alkyl group represented by $R^3$, $R^4$ or $R^5$ may be either a straight chain alkyl group or a branched chain alkyl group, such as a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, an octadecyl group, a nonadecyl group, an eicosyl group, etc., and the cycloalkyl group represented by $R^3$, $R^4$ or $R^5$ can be, for example, a cyclopentyl group and a cyclohexyl group. The aryl group represented by $R^3$, $R^4$ or $R^5$ can be a phenyl group, a naphthyl group, etc., the alkenyl group represented by $R^3$, $R^4$ or $R^5$ can be a butenyl group, a pentenyl group, a hexenyl group, a heptenyl group, an octenyl group, a decenyl group, a dodecenyl group, an octadecenyl group, etc. These alkyl, cycloalkyl, aryl and alkenyl groups may also have one or more substituents. Examples of suitable substituents for the alkyl, cycloalkyl and alkenyl groups include a halogen atom (e.g., a fluorine atom, a chlorine atom, etc.), an alkoxy group (e.g., a methoxy group, an ethoxy group, a butoxy group, etc.), an aryl group (e.g., a phenyl group, a tolyl group, a naphthyl group, etc.), an aryloxy group (e.g., a phenoxy group, etc.), an alkenyl group, an alkoxycarbonyl group, etc., and examples of substituents for the aryl group include an alkyl group, etc., in addition to those for the alkyl, cycloalkyl and alkenyl group described above. Preferable examples of $R^3$, $R^4$ and $R^5$ include a tolyl group, a 2-ethylhexyl group, a 7-methyloctyl group, a cyclohexyl group, a straight chain alkyl group containing 8 to 18 carbon atoms, etc.

In the present invention, the term "high boiling organic solvents" means those organic solvents which have a boiling point of about 175° C. or above at atmospheric pressure.

In the present invention, the high boiling organic solvent represented by the general formula (II) may be used in any amount depending upon the kind and the amount of magenta coupler represented by the general formula (I). However, the ratio of the high boiling organic solvent to magenta coupler is preferably about 0.05:1 to about 20:1 by weight. In addition, the high boiling organic solvent to be used in the present invention represented by the general formula (II) may be used in combination with other conventionally known high boiling organic solvents as long as the objects of the present invention can be achieved. Examples of such known solvents include phthalate type solvents (e.g., dibutyl phthalate, di-2-ethylhexyl phthalate, etc.), amide type solvents (e.g., N,N-diethyldodecanamide), fatty acid ester type solvents, benzoate type solvents, phenolic solvents (e.g., 2,5-di-tert-amylphenol, etc.), etc.

Examples of processes for the synthesis of high boiling organic solvents represented by the general formula (II) are described in U.S. Pat. No. 3,676,137, Japanese Patent Application (OPI) Nos. 119235/79, 119921/79, 119922/79, 25057/80, etc.

Specific examples of high boiling organic solvents represented by the general formula (II) are illustrated below. However, the present invention is not to be construed to be limited thereto.

$O{=}P(OC_4H_9{-}\underline{n})_3$ (S-1)

$O{=}P(OCH_2CH_2CH(CH_3)_2)_3$ (S-2)

$O{=}P(OC_6H_{13}{-}\underline{n})_3$ (S-3)

(S-4)

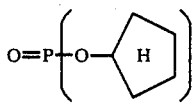

(S-5)

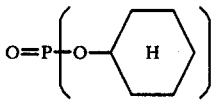

$O{=}P(OC_8H_{17}{-}\underline{n})_3$ (S-6)

(S-7)

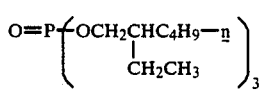

(S-8)

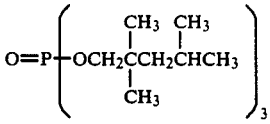

(S-9)

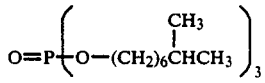

$O{=}P(OC_9H_{19}{-}\underline{n})_3$ (S-10)

-continued (S-11) $O{=}P\left(OCH(CH_3)(CH_2)_6CH_3\right)_3$ (S-12) $O{=}P(OC_{10}H_{21}\text{-}n)_3$ (S-13) $O{=}P\left(OCH_2CH_2CH(CH_3)CH_2CH_2C(CH_3)_2\right)$ (S-14) $O{=}P(O(CH_2)_6CH(CH_3)_2)[O(CH_2)_7CH(CH_3)_2]_2$ (S-15) $O{=}P(OC_4H_9\text{-}n)(OC_{12}H_{25}\text{-}n)_2$ (S-16) $O{=}P(OC_{12}H_{25}\text{-}n)_3$ (S-17) $O{=}P\left(OCH(CH_3)CH_2CH_2CH(CH_3)_2\right)_3$ (S-18) $O{=}P\left(OCH(CH_3)(CH_2)_5CH_3\right)_3$ (S-19) $O{=}P\left(OCH(CH_3)(CH_2)_9CH_3\right)_3$ (S-20) $O{=}P(OC_{14}H_{29}\text{-}n)_3$ (S-21) $O{=}P(OC_{15}H_{31}\text{-}n)_3$ (S-22) $O{=}P(OC_{16}H_{33}\text{-}n)_3$ (S-23) $O{=}P(OCH{=}CHC_{16}H_{33})_3$ (S-24) 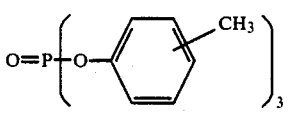

(S-25) 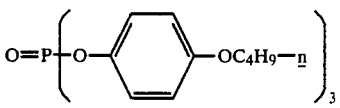

(S-26) 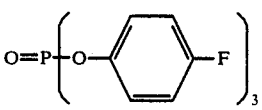

(S-27) 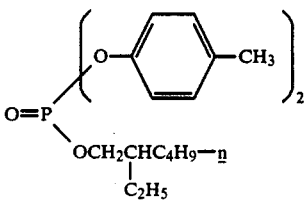

Dyes derived from a coupler must have a preferable hue for color reproduction. Specifically, the color region of the main absorption is in a suitable range, and a distinct color dye with less unnecessary absorption is desirable. The pattern of the absorption spectrum of the dye on, particularly, the longer wavelength side greatly influences the distinctness of color. The smaller the difference between the wavelength at which the absorption is 50%, 10% or 2% of the maximum absorption and the wavelength at which the absorption is maximal, the sharper the hue. Dyes with such sharp hue provide a distinct color dye with less color stain not only when used alone but when used together with other dyes with different hues. In the present invention, the phrase "toe cut of absorption" can be expressed quantitatively in terms of the above-described 10% or 2% absorption wavelength width, etc.

The magenta couplers and the high boiling organic solvents in accordance with the present invention can be dispersed and incorporated into at least one hydrophilic organic colloidal layer constituting a photographic light-sensitive layer.

Techniques for introducing couplers into a silver halide emulsion layer are known and are described in, for example, U.S. Pat. No. 2,322,027, these being generally employed.

The high boiling organic solvents represented by the general formula (II) (phosphoric ester type coupler solvents) generally have an extremely good solubility for the couplers of the present invention. However, where the solubility of the coupler is insufficient because a small coupler solvent/coupler ratio is employed, other coupler solvents such as phthalic ester type coupler solvents, low boiling organic solvents, etc., may be used in combination. In the present invention, a low boiling organic solvent having a boiling point of about 30° to about 150° C., such as a lower alkyl acetate (e.g., ethyl acetate, butyl acetate, etc.), ethyl propionate, sec-butyl alcohol, methyl isobutyl ketone, β-ethoxyethyl acetate, methyl Cellosolve acetate, etc., may be allowed to coexist in the phosphoric ester type coupler solvent before dissolving the coupler in the coupler solvent. In addition, the coupler of the present invention may be dissolved in the low boiling organic solvent described above, then the high boiling organic solvent represented by the general formula (II) may be added thereto.

The mixing ratio of other coupler solvents to the high boiling organic solvents represented by the general formula (II) is in the range of about 0.1 to 10, preferably about 0.2 to 5 by weight.

In incorporating the coupler, thus dissolved in the coupler solvent according to these techniques, into a silver halide emulsion layer, the dispersing technique using a polymer described in, for example, Japanese Patent Publication No. 39853/76 and Japanese Patent Application (OPI) No. 59943/76 may be employed in combination.

Where couplers have an acid group such as a carboxylic acid group or a sulfonic acid group, they may be introduced into the hydrophilic colloid layer as an alkaline aqueous solution.

As a binder or protective colloid which can be used for emulsion layers or interlayers of the light-sensitive material of the present invention, gelatin is advantageously used. However, other hydrophilic colloids may be used alone or in combination with gelatin.

As the gelatin which can be used in the present invention, either lime-processed gelatin or acid-processed gelatin may be used. Detailed descriptions on preparation of gelatin are given in Arser Wais, *The Macromolecular Chemistry of Gelatin,* Academic Press (1964).

In a photographic emulsion layer of photographic light-sensitive material used in the present invention, any of silver bromide, silver bromoiodide, silver chlorobromoiodide, silver chlorobromide, and silver chloride may be used as the silver halide. A preferred silver halide is silver bromoiodide containing 15 mol% or less silver iodide, particularly 2 mol% to 12 mol% silver iodide.

The silver halide grains in the photographic emulsion are not particularly limited as to mean particle size (particle diameter with respect to spherical or approximately spherical particles, and edge length with cubic particles; presented in terms of an average based on projected area), with particle size of about 3 μm or less being preferable. The particle size distribution can be either narrow or broad.

Silver halide grains in the photographic emulsion may be in a regular crystal form such as a cubic or octahedral form, in an irregular crystal form such as a spherical or platy form, or in a mixed form thereof, or may comprise a mixture of grains in different forms.

In addition, an emulsion in which superplaty silver halide grains having a diameter-to-thickness ratio of about 5:1 or more account for 50% or more of the total projected area may also be used.

The silver halide grains may have an inner portion and a surfafe layer different from each other in phase composition. In addition, silver halide grains of the type forming latent images mainly on the surface thereof and grains of the type forming latent images mainly within them may be used.

The photographic emulsion which can be used in the present invention can be prepared by the processes described in P. Glafkides, *Chimie et Physique Photographique,* Paul Montel (1967), G. F. Duffin, *Photographic Emulsion Chemistry,* The Focal Press (1966), V. L. Zelikman et al., *Making and Coating Photographic Emulsions,* The Focal Press (1964), etc. That is, any of an acidic process, a neutral process, and an ammoniacal process can be used. As a manner of reacting a soluble silver salt with a soluble halide salt, any of the single jet mixing method, double jet mixing method and a combination thereof may be employed.

A process of forming grains in the presence of excess silver ion (the so-called reversal mixing process) can be employed as well. As one type of the double jet mixing method, a process called a controlled double jet process wherein the pAg in the liquid phase in which the silver halide is formed is kept constant can be employed. This process provides a silver halide emulsion containing silver halide grains of a regular crystal form having an approximately uniform particle size.

Two or more silver halide emulsions separately prepared may be mixed for use.

During formation or physical ripening of the silver halide grains, cadmium salts, zinc salts, lead salts, thallium salts, iridium salts or the complex salts thereof, rhodium salts or the complex salts thereof, iron salts or the complex salts thereof, etc., may also be present.

Silver halide emulsions are usually subjected to chemical sensitization. This chemical sensitization can be conducted according to the processes described in, for example, H. Frieser, *Die Grundlagen der Photographischen Prozesse mit Silberhalogeniden,* Akademische Verlagsgesellschaft (1968), pp. 675–734.

That is, sulfur sensitization using active gelatin or sulfur-containing compounds capable of reacting with silver (e.g., thiosulfates, thioureas, mercapto compounds, rhodanines, etc.); reduction sensitization using a reductive substance (e.g., stannous salts, amines, hydrazine derivatives, formamidinesulfinic acid, silane compounds, etc.); and noble metal sensitization using compounds of noble metals (e.g., complex salts of the Group VIII metals such as Pt, Ir, Pd, etc., as well as gold complex salts) can be employed alone or in combination.

Various compounds for the purpose of preventing formation of fog or stabilizing photographic properties may be incorporated in the photographic emulsion used in the present invention during the steps of producing, or during storage or processing of, light-sensitive materials. That is, many compounds known as antifoggants or stabilizers such as azoles (e.g., benzothiazolium salts, nitroimidazoles, nitrobenzimidazoles, chlorobenzimidazoles, bromobenzimidazoles, mercaptothiazoles, mercaptobenzothiazoles, mercaptobenzimidazoles, mercaptothiadiazoles, aminotriazoles, benzotriazoles, nitrobenzotriazoles, mercaptotetrazoles (particularly 1-phenyl-5-mercaptotetrazole), etc.); mercaptopyrimidines; mercaptotriazines; thioketo compounds such as oxazolinethione; azaindenes (e.g., triazaindenes, tetraazaindenes (particularly 4-hydroxy-substituted (1,3,3*a*,7)tetraazaindenes), pentaazaindenes, etc.); benzenethiosulfonic acid, benzenesulfinic acid, benzenesulfonic acid amide, etc., can be added.

The photographic light-sensitive material of the present invention may contain in its photographic emulsion layers or other hydrophilic colloidal layers various surfactants for various purposes such as improvement of coating properties, antistatic properties, slipping properties, emulsion dispersibility, antiadhesion properties, and photographic properties (for example, development acceleration, realization of contrasty tone, sensitization, etc.).

The light-sensitive material of the present invention may contain a polyalkylene oxide or its ether, ester or amine derivative, a thioether compound, a thiomorpholine, a quaternary ammonium salt compound, a urethane derivative, a urea derivative, an imidazole derivative, a 3-pyrazolidone, etc., for the purpose of enhancing sensitivity or contrast or for accelerating development.

The photographic light-sensitive material of the present invention may contain in its photographic emulsion layer or other hydrophilic colloidal layer a dispersion of a water-insoluble or slightly water-soluble synthetic polymer for improving dimensional stability, etc.

Photographic emulsions used in the present invention may be spectrally sensitized with methine dyes or the like. Dyes which can be used include cyanine dyes, merocyanine dyes, complex cyanine dyes, complex merocyanine dyes, holopolar cyanine dyes, hemicyanine dyes, styryl dyes and hemioxonol dyes. Particularly useful dyes are cyanine dyes, merocyanine dyes and complex merocyanine dyes. In these dyes, any nuclei ordinarily used as basic hetero ring nuclei in cyanine dyes can be present. That is, a pyrroline nucleus, an oxazoline nucleus, a thiazoline nucleus, a pyrrole nucleus, an oxazole nucleus, a thiazole nucleus, a selenazole nucleus, an imidazole nucleus, a tetrazole nucleus, a pyridine nucleus, etc.; those in which these nuclei are fused with an alicyclic hydrocarbon ring and those in which these nuclei are fused with an aromatic hydrocarbon ring, i.e., an indolenine nucleus, a benzindolenine nucleus, an indole nucleus, a benzoxazole nucleus, a naphthoxazole nucleus, a benzothiazole nucleus, a naphthothiazole nucleus, a benzoselenazole nucleus, a benzimidazole nucleus, a quinoline nucleus, etc., can be used. These nuclei may be substituted with substituents at the nucleus carbon atoms.

In the merocyanine dyes or complex merocyanine dyes, 5- or 6-membered hetero ring nuclei such as a pyrazolin-5-one nucleus, a thiohydantoin nucleus, a 2-thiooxazolidine-2,4-dione nucleus, a thiazolidine-2,4-dione nucleus, a rhodanine nucleus, a thiobarbituric acid nucleus, etc., may be used as ketomethylene structure-containing nuclei.

These sensitizing dyes may be used alone or in combination.

A combination of sensitizing dyes is often employed particularly for the purpose of supersensitization.

A dye which itself is not sensitizing or a substance which substantially does not absorb visible light and which shows a supersensitizing effect may be incorporated together with the sensitizing dye. For example, aminostilbene compounds substituted with a nitrogen-containing hetero ring (for example, those described in U.S. Pat. Nos. 2,933,390 and 3,635,721), aromatic organic acid-formaldehyde condensates (for example, those described in U.S. Pat. No. 3,743,510), cadmium salts, azaindene compounds, etc., may be incorporated.

The present invention may also be applied to a multilayered, multicolor photographic material comprising a support having thereon at least two layers with different spectral sensitivity. Multilayered natural color photographic materials usually comprise a support having thereon at least one red-sensitive emulsion layer, at least one green-sensitive emulsion layer, and at least one blue-sensitive emulsion layer. The order of these layers may be optionally selected as the case demands. The red-sensitive emulsion layer usually contains a cyan dye forming coupler, the green-sensitive emulsion layer a magenta dye forming coupler and the blue-sensitive emulsion layer a yellow dye forming coupler. However, in some cases, different combinations may be employed.

In the same or other photographic emulsion layer or light-insensitive layer of the photographic light-sensitive material prepared according to the present invention, other dye forming couplers, i.e., compounds capable of forming color dyes by oxidative coupling with an aromatic primary amine developing agent (e.g., a phenylenediamine derivative, an aminophenol derivative, etc.) in color development processing, may be used together with the coupler represented by the foregoing general formula (I). For example, suitable magenta couplers include 5-pyrazolone couplers, pyrazolobenzimidazole couplers, pyrazolo[5,1-c][1,2,4]triazole couplers, pyrazolopyrazole couplers, pyrazolotetrazole couplers, open chain acylacetonitrile couplers, etc., suitable yellow couplers include acylacetamide couplers (e.g., benzoylacetanilides, pivaloylacetanilides, etc.), etc., and suitable cyan couplers include naphthol couplers and phenol couplers. Of these couplers, non-diffusible couplers having a hydrophobic group called a ballast group or polymerized couplers are advantageous. The couplers may be either 4-equivalent type or 2-equivalent type with respect to silver ion. Colored couplers having a color correcting effect or couplers capable of releasing a development inhibitor upon development (called DIR couplers) may also be incorporated. In addition to the DIR couplers, non-color-forming DIR coupling compounds capable of forming a colorless coupling reaction product and releasing a development inhibitor may also be incorporated.

Two or more of the couplers of the present invention and the above-described couplers may of course be used in one and the same layer, or the same compound may be present in two or more different layers for attaining properties required for light-sensitive materials.

The photographic light-sensitive material of the present invention may contain an organic or inorganic hardener in its photographic emulsion layers or other hydrophilic colloidal layers. For example, chromium salts (e.g., chromium alum, chromium acetate, etc.), aldehydes (e.g., formaldehyde, glyoxal, glutaraldehyde, etc.), N-methylol compounds (e.g., dimethylolurea, methyloldimethylhydantoin, etc.), dioxane derivatives (e.g., 2,3-dihydroxydioxane, etc.), active vinyl compounds (e.g., 1,3,5-triacryloyl-hexahydro-s-triazine, 1,3-vinylsulfonyl-2-propanol, etc.), active halogen compounds (e.g., 2,4-dichloro-6-hydroxy-s-triazine, etc.), mucohalogeic acids (e.g., mucochloric acid, mucophenoxychloric acid, etc.), etc., can be used alone or in combination.

Where the light-sensitive material according to the present invention contains a dye, an ultraviolet light absorbent, etc., in its hydrophilic colloidal layer, they may be mordanted with a cationic polymer or the like.

The light-sensitive material of the present invention may contain hydroquinone derivatives, aminophenol derivatives, ascorbic acid derivatives, etc., as color fog preventing agents.

The light-sensitive material of the present invention may contain in its hydrophilic colloidal layer an ultraviolet light absorbent. For example, aryl groupsubstituted benzotriazole compounds (e.g., those described in U.S. Pat. No. 3,533,794), 4-thiazolidone compounds (e.g., those described in U.S. Pat. Nos. 3,314,794, 3,352,681, etc.), benzophenone compounds (e.g., those described in Japanese Patent Application (OPI) No. 2784/71), cinnamic ester compounds (e.g., those described in U.S. Pat. Nos. 3,705,805 and 3,707,375), butadiene compounds (e.g., those described in U.S. Pat. No. 4,045,229), and benzoxidol compounds (e.g., those described in U.S. Pat. No. 3,700,455) may be used. Ultraviolet light absorbing couplers (e.g., $\alpha$-naphtholic and cyan dye forming couplers), ultraviolet light absorbing polymers, etc., may also be used. These ultraviolet light absorbents may be mordanted in a specific layer.

The light-sensitive material of the present invention may contain a water-soluble dye as a filter dye or for various purposes such as prevention of irradiation. Examples of such dyes include oxonol dyes, hemioxonol dyes, styryl dyes, merocyanine dyes, cyanine dyes and azo dyes. Oxonol dyes, hemioxonol dyes and merocyanine dyes are particularly useful of these dyes.

In the practice of the present invention, the following known dye stabilizers can be used in combination. Color image stabilizers used in the present invention may be employed as a combination of two or more thereof. Suitable known dye stabilizers include, for example, hydroquinone derivatives, gallic acid derivatives, p-alkoxyphenols, p-hydroxyphenol derivatives, bisphenols, etc.

The photographic processing of the layers composed of photographic emulsion used in the present invention can be conducted by any known process and using known processing solutions described in, for example,

*Research Disclosure,* 176, pages 28 to 30.The processing temperature is usually between about 18° and about 50° C. However, temperatures lower than about 18° C. or higher than about 50° C. may be employed.

Suitable fixing solutions are those which have the same formulation as are ordinarily employed. Organic sulfur compounds which are known to function as fixing agents can be used as well as thiosulfates and thiocyanates. The fixing solution may contain a water-soluble aluminum salt as a hardener.

Color developers generally comprise an alkaline aqueous solution containing a color developing agent. Suitable color developing agents include known primary aromatic amine developing agents such as phenylenediamines (e.g., 4-amino-N,N-diethylaniline, 3-methyl-4-amino-N,N-diethylaniline, 4-amino-N-ethyl-N-β-hydroxyethylaniline, 3-methyl-4-amino-N-ethyl-N-β-hydroxyethylanilien, 3-methyl-4-amino-N-ethyl-N-β-methanesulfonamidoethylaniline, 4-amino-3-methyl-N-ethyl-N-β-methoxyethylaniline, etc.).

In addition, those described in L. F. A. Mason, *Photographic Processing Chemistry,* Focal Press (1966), pp. 226–229, U.S. Pat. Nos. 2,193,015 and 2,592,364, Japanese Patent Application (OPI) No. 64933/73, etc., may also be used.

The color developer may further contain pH buffers such as alkali metal sulfites, carbonates, borates or phosphates, development inhibitors or antifogging agents such as bromides, iodides, and organic antifogging agents and, if necessary, a water softener, a preservative (e.g., hydroxylamine), an organic solvent (e.g., benzyl alcohol, diethylene glycol, etc.), a development accelerator (e.g., polyethylene glycol, a quaternary ammonium salt, an amine, etc.), a dye forming coupler, a competitive coupler, a fogging agent (e.g., sodium borohydride), an auxiliary developing agent (e.g., 1-phenyl-3-pyrazolidone), a viscosity imparting agent, a polycarboxylic acid type chelating agent, an antioxidant, etc.

Color developed photographic emulsion layers are usually bleached. Bleaching may be conducted separately or simultaneously with fixing. Compounds of polyvalent metals such as iron (III), cobalt (III), chromium (VI), copper (II), etc., peracids, quinones, nitroso compounds, etc., can be used as bleaching agents.

For example, ferricyanates, dichromates, organic complex salts of iron (III) or cobalt (III) such as complex salts with an aminopolycarboxylic acid (e.g., ethylenediaminetetraacetic acid, nitrilotriacetic acid, 1,3-diamino-2-propanoltetraacetic acid, etc.) or an organic acid (e.g., citric acid, tartaric acid, maleic acid, etc.); persulfates, permanganates; nitrosophenol; etc., may be used. Of these, potassium ferricyanate, iron (III) sodium ethylenediaminetetraacetate, and iron (III) ammonium ethylenediaminetetraacetate are particularly useful. Iron (III) ethylenediaminetetraacetates are useful in both an independent bleaching solution and a monobath bleach-fixing solution.

The color photographic emulsion layer in accordance with the present invention forming the dye image layer is coated on a flexible support such as a synthetic resin film, paper or cloth usually used for photographic light-sensitive materials. Useful flexible supports include films composed of semisynthetic or synthetic high polymers such as cellulose nitrate, cellulose acetate butyrate, polystyrene, polyethylene terephthalate, polycarbonate, etc., and papers coated or liminated with a baryta layer or an α-olefin polymer (for example, polyethylene, polypropylene, etc.). The support may be colored with a dye or a pigment, or may be blackened for intercepting light.

In the case of using these supports for reflection materials, a white pigment is desirably added to the support or to a laminate layer. Suitable white pigments include titanium dioxide, barium sulfate, zinc oxide, zinc sulfide, calcium carbonate, antimony trioxide, silica white, alumina white, titanium phosphate, etc. Of these, titanium dioxide, barium sulfate and zinc oxide are particularly useful.

The surface of the support is generally subbed for improving adhesion to a photographic emulsion layer or the like. The support surface may be subjected to a corona discharge treatment, a UV light irradiation, or a flame treatment before or after the subbing treatment.

In reflection materials containing the magenta couplers used in the present invention, polymer laminated paper is often used as support. However, the use of a synthetic resin film containing a white pigment incorporated therein provides photographic images with particularly excellent saturation and expression in the dark areas as well as improved smoothness, glossiness and sharpness, thus being particularly preferred. In this case, polyethylene terephthalate or cellulose acetate is particularly useful as the synthetic resin material, and barium sulfate or titanium oxide as the white pigment.

After development processing and drying, the surface and the back of the photographic material of the present invention may be laminated with plastic film. Polyolefin, polyester, polyacrylate, polyvinyl acetate, polystyrene, butadiene-styrene copolymer, polycarbonate, etc., can be used as the laminating plastic film. Polyethylene terephthalate, vinyl alcohol-ethylene copolymer, polyethylene, etc., are particularly useful.

The present invention is now illustrated in greater detail by reference to the following examples which, however, are not to be construed as limiting the present invention in any way. Unless otherwise indicated all parts, percents, ratios and the like are by weight.

EXAMPLE 1

The following magenta dye obtained by reacting illustrative Coupler (M–6) with the following developing agent in the presence of ammonium persulfate and potassium sulfate was dissolved in an equal weight of illustrative Compound (S–7) using ethyl acetate as assistant solvent. After evaporating off the ethyl acetate, the visible absorption spectrum of this dye solution was measured.

Developing Agent:

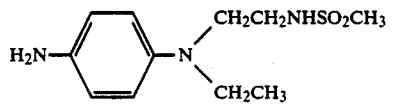

Magenta Dye:

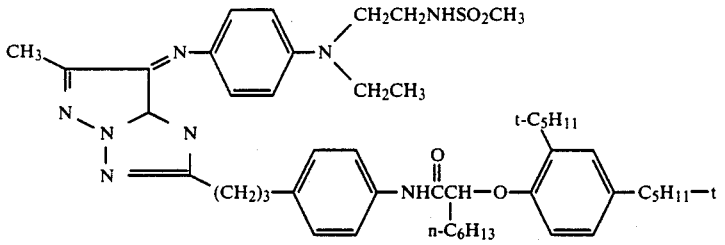

For comparison, the visible absorption spectrum of a dye solution prepared by dissolving the above-described magenta dye in an equal weight of dibutyl phthalate was measured (Comparative Example 1). Further, the visible absorption spectrum of a solution prepared by dissolving the following comparative magenta dye in an equal weight of illustrative Compound (S-7) (Comparative Example 2) and that of a solution prepared by dissolving the same dye in dibutyl phthalate (Comparative Example 3) were measured.

The thus obtained absorption spectra are shown in FIG. 1.

Comparative Magenta Dye:

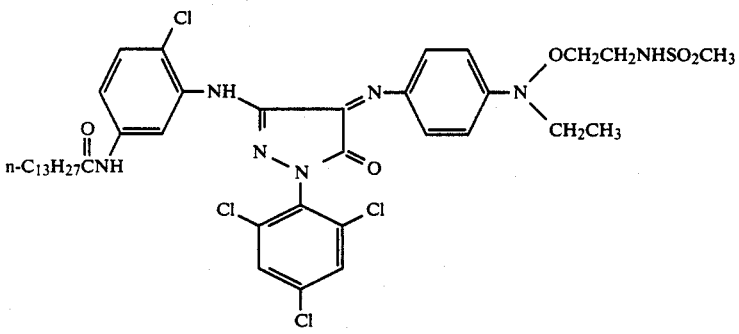

It can be seen from FIG. 1 that, while the magenta dye formed from the 5-pyrazolone type coupler does not show a great change in the absorption spectrum when dissolved in the phosphoric ester type solvent of the present invention and when dissolved in dibutyl phthalate, the magenta dye formed from the pyrazoloazole type coupler of the present invention shows a greatly improved toe cut of the absorption spectrum on the longer wavelength side when dissolved in the phosphoric ester solvent of the present invention in comparison with the result obtained when it is dissolved in dibutyl phthalate. In addition, since the magenta dye formed from the pyrazoloazole type coupler used in the present invention has no side absorption on the shorter wavelength side, the absorption spectrum of this magenta dye dissolved in the phosphoric ester solvent of the present invention is found to be suited for improving the color reproducibility of a color photograph. (The visual absorption spectrum was measured using an automatic recording spectrophotometer, Model 340, made by Hitachi, Ltd.)

EXAMPLE 2

20 g of illustrative Compound (S-24) and 25 ml of ethyl acetate were added to 10 g of illustrative Magenta Coupler (M-6), and the resulting mixture was heated to 50° C. to prepare a solution. Then, this solution was added to 100 ml of an aqueous solution containing 10 g of gelatin and 1.0 g of sodium dodecylbenzenesulfonate, followed by mechanical dispersion to prepare a fine emulsion dispersion. The total quantity of this emulsion dispersion was added to 100 g of a silver chlorobromide emulsion containing 50 mol% Br (containing 6.55 g of Ag), 10 ml of a 2% solution of 2,4-dihydroxy-6-chloro-s-triazine sodium salt (hardener) was added thereto, and the resulting mixture was coated in a silver amount of 200 mg/m$^2$ on a paper support laminated on both sides with polyethylene, followed by providing a gelatin layer thereon to prepare a sample. This sample was designated Sample A.

Then, Samples B, C and D were prepared in the same manner as described above except for using illustrative Compound (S-7), di-2-ethylhexyl phthalate, and 2,4-di-tert-pentylphenol, respectively, in place of illustrative Compound (S-24).

On the other hand, Sample E was prepared using the following comparative coupler in place of Coupler (M-6) used in Example 1 and illustrative Compound (S-24) as a solvent.

The thus prepared Samples A to E were subjected to 1,000 CMS wedge exposure, then processed using the following solutions.

Comparative Coupler (A)

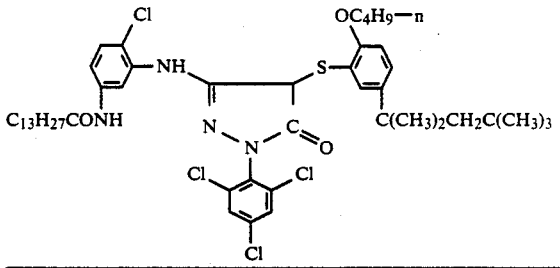

| Developer: | |
|---|---|
| Benzyl Alcohol | 15 ml |
| Diethylenetriaminepentaacetic Acid | 5 g |
| KBr | 0.4 g |
| $Na_2SO_3$ | 5 g |

-continued

Comparative Coupler (A)

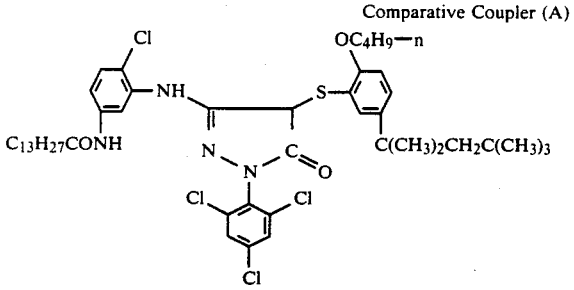

| | |
|---|---|
| $Na_2CO_3$ | 30 g |
| Hydroxylamine Sulfate | 2 g |
| 4-Amino-3-methyl-N—β-(methane-sulfonamido)ethylaniline.3/2$H_2SO_4$.$H_2O$ | 4.5 g |
| Water to make | 1,000 ml |
| | pH: 10.1 |
| Bleach-Fixing Solution: | |
| Ammonium Thiosulfate (70 wt %) | 150 ml |
| $Na_2SO_3$ | 5 g |
| Na[Fe(EDTA)] | 40 g |
| EDTA* | 4 g |
| Water to make | 1,000 ml |
| | pH: 6.8 |

| Processing Steps | Temperature | Time |
|---|---|---|
| Developer | 33° C. | 3 min 30 sec |
| Bleach Fixing Solution | 33° C. | 1 min 30 sec |
| Washing with water | 28–35° C. | 3 min |

*EDTA means ethylenediaminetetraacetic acid

Figure 2:
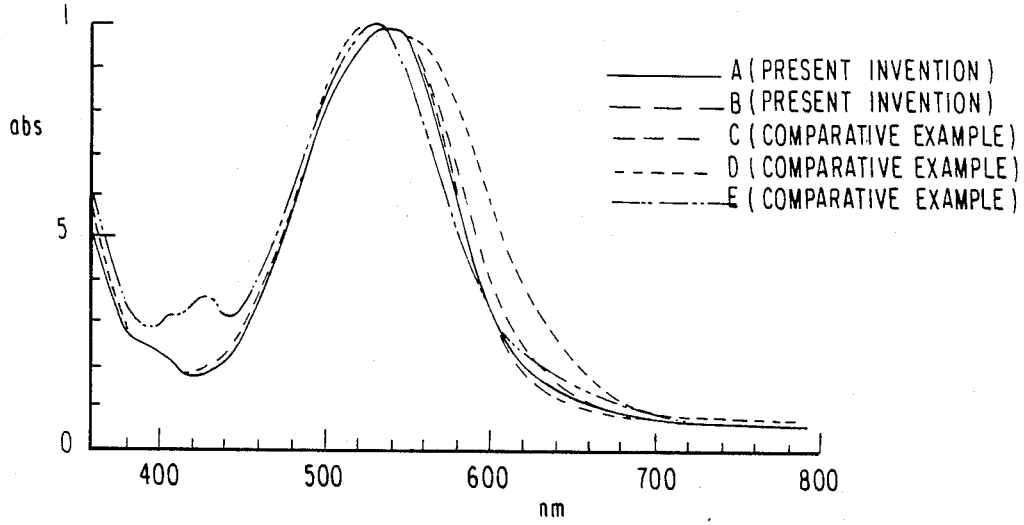

The reflection spectrum of each of the thus obtained dye images of the samples was measured at a εmax of 1.0 using an automatic recording spectrophotometer, Model 340 (made by Hitachi, Ltd.), to obtain the results shown in FIG. 2 (with the reference of magnesium oxide).

As a result, it is seen that the high boiling phosphoric ester solvent of the present invention represented by the general formula (II) gives the pyrazoloazole type coupler of the present invention desirable spectral absorption characteristics as magenta color forming agent for subtractive color photography, i.e., less absorption on the longer wavelength side (600 nm and longer), no side absorption as is different from known pyrazolone type couplers, and less absorption on the shorter wavelength side, thus giving preferred spectral absorption curve for color reproduction.

EXAMPLE 3

A first layer (lowermost layer) to a seventh layer (uppermost layer) were coated as shown in Table I below on a paper laminated with polyethylene on both sides to prepare Color Photographic Light-Sensitive Materials F to J.

The coating solutions for forming the respective emulsion layers were prepared according to the procedures described in Example 2.

In Samples F, G, H and I, Coupler (M-6) is used as a magenta coupler and Compound (S-24) for Sample F, Compound (S-7) for Sample G, di-2-ethylhexyl phthalate for Sample H and 2,4-di-tert-pentylphenol for Sample I are used as a solvent in the 3rd layer. In Sample J, Comparative Coupler (A) is used as a magenta coupler and Compound (S-24) is used as a solvent in the 3rd layer.

Each of these five (F to J) samples was exposed using a B-G-R three color separation filter, and processed in the same manner as described in Example 2.

Of the thus obtained samples, Samples F and G provided distinct images having high saturation. However, Samples H, I and J provided images having low saturation, and Samples H and I gave violet tone, which is disadvantageous with respect to color reproduction.

TABLE I

| | |
|---|---|
| 7th Layer | Gelatin (coated amount: 1,600 mg/m$^2$) |
| 6th Layer | Gelatin (coated amount: 1,000 mg/m$^2$)<br>UV Light Absorbent *1 (coated amount: 360 mg/m$^2$)<br>Solvent *2 (coated amount: 120 mg/m$^2$) |
| 5th Layer | AgClBr Emulsion (Br: 50 mol %; coated silver amount: 300 mg/m$^2$)<br>Gelatin (coated amount: 1,200 mg/m$^2$)<br>Cyan Coupler *3 (coated amount: 400 mg/m$^2$)<br>Solvent *2 (coated amount: 250 mg/m$^2$) |
| 4th Layer | Gelatin (coated amount: 1,600 mg/m$^2$)<br>UV Light Absorbent *1 (coated amount: 700 mg/m$^2$)<br>Color Stain Preventing Agent *4 (coated amount: 200 mg/m$^2$)<br>Solvent *2 (coated amount: 300 mg/m$^2$) |
| 3rd Layer | AgClBr Emulsion (Br: 50 mol %; coated silver amount: 180 mg/m$^2$)<br>Magenta Coupler *5 (coated amount: 275 mg/m$^2$)<br>Solvent *6 (coated amount: 550 mg/m$^2$) |
| 2nd Layer | Gelatin (coated amount: 1,100 mg/m$^2$)<br>Color Stain Preventing Agent *4 (coated amount: 200 mg/m$^2$)<br>Solvent *2 (coated amount: 100 mg/m$^2$) |
| 1st Layer | AgClBr Emulsion (Br: 80 mol %; coated silver amount 350 mg/m$^2$)<br>Gelatin (coated amount: 1,500 mg/m$^2$)<br>Yellow Coupler *7 (coated amount: 500 mg/m$^2$)<br>Solvent *8 (coated amount: 400 mg/m$^2$) |
| Support | Paper support laminated with polyethylene on both sides |

*1 UV Light Absorbent: 2-(2-Hydroxy-3-sec-butyl-5-tert-butylphenyl)benzotriazole
*2 Solvent: Dibutyl phthalate
*3 Cyan Coupler: 2-[α-(2,4-Di-tert-pentylphenoxy)-butanamido]-4,6-dichloro-5-methylphenol
*4 Color Stain Preventing Agent: 2,5-Dioctylhydroquinone
*5 Magenta Coupler: (M-6) and Comparative Coupler (A)
*6 Solvent: (S-24), (S-7), di-2-ethylhexyl phthalate, 2,4-di-tert-pentylphenol
*7 Yellow Coupler: α-Pivaloyl-α-(2,4-dioxo-5,5'-dimethyloxazolidin-3-yl)-2-chloro-5-[α-(2,4-di-tert-pentylphenoxy)butanamido]-acetanilide
*8 Solvent: Dioctylbutyl phosphate

EXAMPLE 4

Samples F to J prepared in Example 3 were exposed in the same manner as described in Example 2 using a B-G-R three color separation filter, and processed in the same manner. The thus obtained samples were subjected to three week fading test using a fluorescent lamp fading apparatus (15,000 lux). The results thus obtained are shown in Table II below.

TABLE II

| Sample | Solvent | Change in Matenta Density (initial density = 1.0) |
|---|---|---|
| F | (S-24) | 0.75 |
| G | (S-7) | 0.78 |
| H | Di-2-ethylhexyl phthalate | 0.63 |
| I | 2,4-Di-tert-pentylphenol | 0.57 |
| J | (S-24) | 0.69 |

It can be seen from the above results that the use of the high boiling solvent represented by the general formula (II) for the pyrazoloazole type compound used in the present invention is also effective for improving color image fastness.

EXAMPLE 5

A multilayered color light-sensitive material comprising a cellulose triacetate film support having provided thereon in sequence the layers having the following formulations was prepared.

| | |
|---|---|
| 1st Layer: Antihalation Layer | |
| Black colloidal silver | 0.2 g of Ag/m$^2$ |
| Gelatin | 1.5 g/m$^2$ |
| UV-1 (UV ray absorbent) | 0.1 g/m$^2$ |
| UV-2 (UV ray absorbent) | 0.2 g/m$^2$ |
| Oil-1 (oil for dispersing UV-1 and UV-2) | 0.01 g/m$^2$ |
| Oil-2 (oil for dispersing UV-1 and UV-2) | 0.01 g/m$^2$ |
| 2nd Layer: Interlayer | |
| Fine grained silver halide (AgBr of 0.07 μm in mean grain size) | 0.15 g of Ag/m$^2$ |
| Gelatin | 1.0 g/m$^2$ |
| Cpd-6 (coupler) | 0.1 g/m$^2$ |
| Cpd-5 (coupler) | 0.02 g/m$^2$ |
| Oil-1 (oil for dispersing Cpd-5 and 6) | 0.1 g/m$^2$ |
| 3rd Layer: | |
| First Red-Sensitive Emulsion Layer | |
| Silver bromoiodide emulsion (mean grain size: 0.7 μm; distribution of iodide: uniform within grains; AgI: 3 mol %) | 0.5 g of Ag/m$^2$ |
| Silver bromoiodide emulsion (mean grain size: 0.3 μm; distribution of iodide: uniform within grains; AgI: 3 mol %) | 0.2 g of Ag/m$^2$ |
| Gelatin | 2.5 g/m$^2$ |
| P-1 (sensitizing dye) | $4.5 \times 10^{-4}$ mol/mol Ag |
| P-2 (sensitizing dye) | $1.5 \times 10^{-4}$ mol/mol Ag |
| Cpd-5 (coupler) | 0.5 g/m$^2$ |
| Cpd-1 (DIR coupler) | 0.02 g/m$^2$ |
| Cpd-5 (coupler) | 0.22 g/m$^2$ |
| Oil-1 (oil for dispersing Cpd-1 and 5) | 0.3 g/m$^2$ |
| Oil-2 (oil for dispersing Cpd-1 and 5) | 0.3 g/m$^2$ |
| 4th Layer: Second | |
| Red-Sensitive Emulsion Layer | |
| Silver bromoiodide emulsion (mean grain size: 1.0 μm; iodide distribution: non-uniform within and between grains; prepared by single jet process; silver iodide: 10 mol %) | 1.2 g of Ag/m$^2$ |
| Gelatin | 1.5 g/m$^2$ |
| P-1 (sensitizing dye) | $3 \times 10^{-4}$ mol/mol Ag |
| P-2 (sensitizing dye) | $1 \times 10^{-4}$ mol/mol Ag |
| Cpd-5 (coupler) | 0.28 g/m$^2$ |
| Oil-1 (oil for dispersing Cpd-5) | 0.12 g/m$^2$ |
| Oil-2 (oil for dispersing Cpd-5) | 0.12 g/m$^2$ |
| 5th Layer: | |
| Third Red-Sensitive Emulsion Layer | |
| Silver bromoiodide emulsion (mean grain size: 2.0 μm; spherical grains prepared by using ammonia upon formation of grains; AgI: 7 mol %) | 2 g/m$^2$ |
| Gelatin | 2 g/m$^2$ |
| P-1 (sensitizing dye) | $2 \times 10^{-4}$ mol/mol Ag |
| P-2 (sensitizing dye) | $0.6 \times 10^{-4}$ mol/mol Ag |
| Cpd-5 (coupler) | 0.28 g/m$^2$ |
| Oil-1 (oil for dispersing Cpd-5) | 0.12 g/m$^2$ |
| Oil-2 (oil for dispersing Cpd 5) | 0.12 g/m$^2$ |
| 6th Layer: Interlayer | |
| Gelatin | 1.0 g/m$^2$ |
| Cpd-2 (for preventing color mixing) | 0.2 g/m$^2$ |
| Oil-1 (oil for dispersing Cpd-2) | 0.1 g/m$^2$ |
| Oil-2 (oil for dispersing Cpd-2) | 0.1 g/m$^2$ |
| 7th Layer: First | |
| Green-Sensitive Emulsion Layer | |
| Silver bromoiodide emulsion (mean grain size: 0.7 μm; iodide distribution: uniform within grains; AgI: 3 mol %) | 0.3 g/m$^2$ |
| Silver bromoiodide emulsion (mean grain size: 0.3 μm; iodide distribution: uniform within grains; AgI: 3 mol %) | 0.1 g/m$^2$ |
| Gelatin | 0.8 g/m$^2$ |
| O-1 (sensitizing dye) | $5 \times 10^{-4}$ mol/mol Ag |

-continued

| | |
|---|---|
| O-2 (sensitizing dye) | $2 \times 10^{-4}$ mol/mol Ag |
| Cpd-6 (coupler) | 0.36 g/m$^2$ |
| Cpd-3 (DIR coupler) | 0.06 g/m$^2$ |
| Oil-1 (oil for dispersing Cpd-3 and 6) | 0.2 g/m$^2$ |
| 8th Layer: Second | |
| Green-Sensitive Emulsion Layer | |
| Silver bromoiodide emulsion (mean grain size: 1.0 μm; iodide distribution: non-uniform within and between grains; prepared by single jet process; AgI: 10 mol %) | 1 g of Ag/m$^2$ |
| Gelatin | 1 g/m$^2$ |
| O-1 (sensitizing dye) | $3.5 \times 10^{-4}$ mol/mol Ag |
| O-2 (sensitizing dye) | $1.4 \times 10^{-4}$ mol/mol Ag |
| Cpd-6 (coupler) | 0.30 g/m$^2$ |
| Oil-1 (oil for dispersing Cpd-6) | 0.15 g/m$^2$ |
| 9th Layer: Third | |
| Green-Sensitive Emulsion Layer | |
| Silver bromoiodide emulsion (mean grain size: 2.0 μm; spherical grains prepared by using ammonia upon formation of grains; AgI: 7 mol %) | 2 g/m$^2$ |
| Gelatin | 2 g/m$^2$ |
| O-1 (sensitizing dye) | $2 \times 10^{-4}$ mol/mol Ag |
| O-2 (sensitizing dye) | $0.8 \times 10^{-4}$ mol/mol Ag |
| Cpd-6 (coupler) | 0.18 g/m$^2$ |
| Oil-1 (oil for dispersing Cpd-6) | 0.2 g/m$^2$ |
| 10th Layer: Yellow Filter Layer | |
| Yellow colloidal silver | 0.04 g of Ag/m$^2$ |
| Gelatin | 1 g/m$^2$ |
| Cpd-2 (agent for preventing color mixing) | 0.2 g/m$^2$ |
| Oil-1 (oil for dispersing Cpd-2) | 0.1 g/m$^2$ |
| Oil-2 (oil for dispersing Cpd-2) | 0.1 g/m$^2$ |
| 11th Layer: | |
| First Blue-Sensitive Emulsion Layer | |
| Silver bromoiodide emulsion (mean grain size: 0.7 μm; iodide distribution: uniform within grains; AgI: 3 mol %) | 0.2 g/m$^2$ |
| Silver bromoiodide emulsion (mean grain size: 0.3 μm; distribution of iodide: uniform within grains; AgI: 3 mol %) | 0.7 g/m$^2$ |
| Gelatin | 1.2 g/m$^2$ |
| O-3 (sensitizing dye) | $3 \times 10^{-4}$ mol/mol Ag |
| Cpd-4 (coupler) | 0.7 g/m$^2$ |
| Cpd-3 (DIR coupler) | 0.03 g/m$^2$ |
| Oil-1 (oil for dispersing Cpd-3 and 4) | 0.5 g/m$^2$ |
| 12th Layer: Second | |
| Blue-Sensitive Emulsion Layer | |
| Silver bromoiodide emulsion (mean grain size: 1.0 μm; iodide distribution: non-uniform within and between grains; prepared by single jet process; AgI: 10 mol %) | 0.3 g of Ag/m$^2$ |
| Gelatin | 0.4 g/m$^2$ |
| O-3 | $2 \times 10^{-4}$ mol/mol Ag |
| Cpd-4 (coupler) | 0.3 g/m$^2$ |
| Oil-1 (oil for dispersing Cpd-4) | 0.2 g/m$^2$ |
| 13th Layer: | |
| Third Blue-Sensitive Emulsion Layer | |
| Silver bromoiodide emulsion (mean grain size: 2.0 μm; spherical grains prepared by using ammonia upon formation of grains; AgI: 7 mol %) | 1 g of Ag/m$^2$ |
| Gelatin | 0.7 g/m$^2$ |
| O-3 (sensitizing dye) | $1.5 \times 10^{-4}$ mol/mol Ag |
| Cpd-4 (coupler) | 0.2 g/m$^2$ |
| Oil-1 (oil for dispersing Cpd-4) | 0.14 g/m$^2$ |
| 14th Layer: First Protective Layer | |
| Gelatin | 1.5 g/m$^2$ |
| UV-1 (UV light absorbent) | 0.1 g/m$^2$ |
| UV-2 (UV Light absorbent) | 0.2 g/m$^2$ |
| Oil-1 (oil for dispersing UV-1 and 2) | 0.01 g/m$^2$ |
| Oil-2 (oil for dispersing UV-1 and 2) | 0.01 g/m$^2$ |

-continued

| 15th Layer: Second Protective Layer | |
|---|---|
| Fine grained silver halide (AgBr; mean grain size: 0.07 μm) | 0.5 g of Ag/m$^2$ |
| Gelatin | 1 g/m$^2$ |
| Polymethyl methacrylate particles (diameter: about 1.5 μm) | 0.2 g/m$^2$ |
| W-1 (static electrification controlling agent) | 0.02 g/m$^2$ |
| H-1 (hardener) | 0.4 g/m$^2$ |
| S-1 (formaldehyde scavenger) | 1 g/m$^2$ |

The thus obtained sample was subjected to gradation exposure using a 4,800° K. white light, then to the following development processing, followed by sensitometry using a densitometer fitted with a status M filter.

The development processing was conducted at 38° C. as follows.

| | |
|---|---|
| 1. Color Development | 3 min & 15 sec |
| 2. Bleaching | 6 min & 30 sec |
| 3. Washing with Water | 3 min & 15 sec |
| 4. Fixing | 6 min & 30 sec |
| 5. Washing with Water | 3 min & 15 sec |
| 6. Stabilizing | 3 min & 15 sec |

Formulations of the processing solutions used in respective steps are as follows.

| | |
|---|---|
| Color Developer: | |
| Sodium Nitrilotriacetate | 1.0 g |
| Sodium Sulfite | 4.0 g |
| Sodium Carbonate | 30.0 g |
| Potassium Bromide | 1.4 g |
| Hydroxylamine Sulfate | 2.4 g |
| 4-(N—Ethyl-N—β-hydroxyethylamino)-2-methylaniline Sulfate | 4.5 g |
| Water to make | 1 liter |
| Bleaching Solution: | |
| Ammonium Bromide | 160.0 g |
| Aqueous Ammonia (28%) | 25.0 cc |
| Sodium Iron Ethylenediaminetetraacetate | 130.0 g |
| Glacial Acetic Acid | 14.0 cc |
| Water to make | 1 liter |
| Fixing Solution: | |
| Sodium Tetrapolyphosphate | 2.0 g |
| Sodium Sulfite | 4.0 g |
| Ammonium Thiosulfate (70%) | 175.0 cc |
| Sodium Bisulfite | 4.6 g |
| Water to make | 1 liter |
| Stabilizing Solution: | |
| Formalin | 8.0 cc |
| Water to make | 1 liter |

Chemical structures of the compounds used in Example 5 are illustrated below.

UV-1

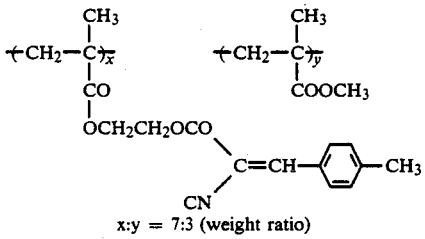

x:y = 7:3 (weight ratio)

UV-2

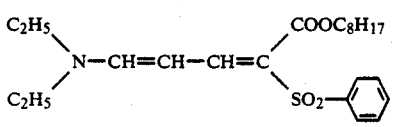

-continued

Oil-1

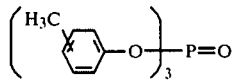

Oil-2

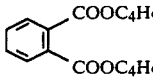

Cpd-1

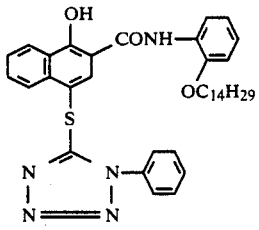

Cpd-2

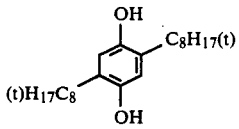

Cpd-3

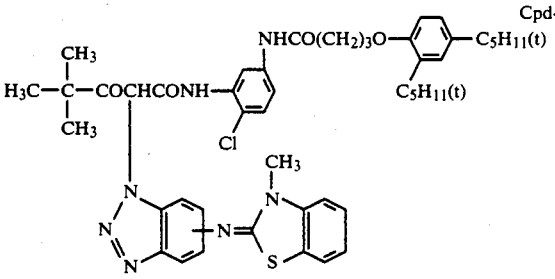

Cpd-4

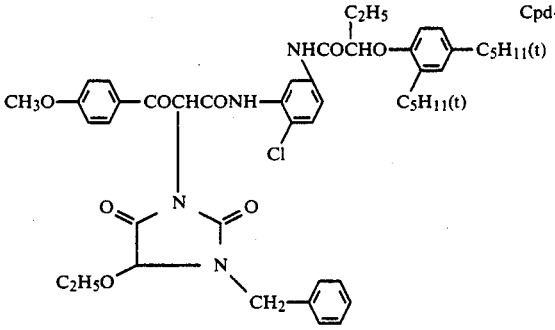

Cpd-5

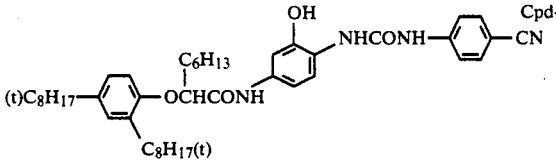

$C_8H_{17}(t)$ represents $(CH_3)_3C—CH_2—C(CH_3)_2—$.

Cpd-6

Corresponds to the magenta coupler of the present invention (M-1).

P-1

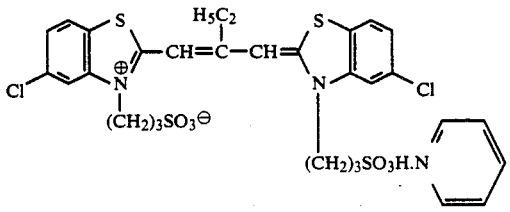

-continued

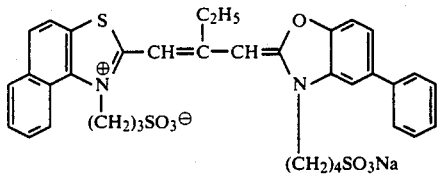

P-2

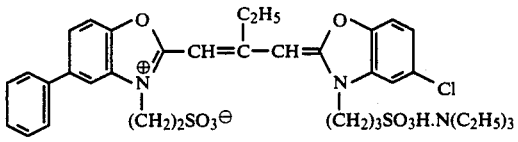

O-1

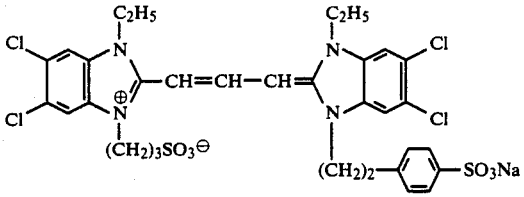

O-2

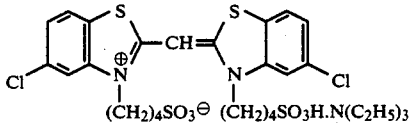

O-3

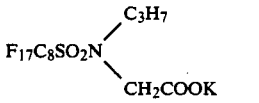

W-1

$(CH_2{=}CH{-}SO_2CH_2CONHCH_2)_2$

H-1

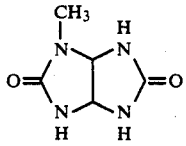

S-1

EXAMPLE 6

Onto a triacetate film base were coated, in this order, the following layers.

1st Layer: Antihalation Layer

A layer of gelatin containing black colloidal silver.

2nd Layer: Gelatin Interlayer

3rd Layer: Slow Speed Red-Sensitive Emulsion Layer

A layer of gold and sulfur sensitized slow speed silver iodobromide emulsion having a silver iodide content of 3.6 mol % and an average grain size of about 0.3 μm and incorporated with a sensitizing dye: 3,3'-di(3-sulfopropyl)-9-ethylnaphtho[1,2-d]carbocyanine and a cyan coupler emulsion consisting of: 2-(heptafluorobutanoylamido)-5-[2'-(2'',4''-di-t-amylphenoxy)butanoylamido]phenol (coupler); and tricresyl phosphate (coupler solvent).

This layer had a silver/coupler ratio of 17.0 and a silver coverage of 0.9 g/m$^2$.

4th Layer: High Speed Red-Sensitive Emulsion Layer

A layer of gold and sulfur sensitized high speed silver iodobromide emulsion having a silver iodide content of 3.5 mol % and an average grain size of about 0.6 μm and incorporated with the same sensitizing dye and cyan coupler emulsion as in the 3rd Layer.

This layer had a silver coverage of 0.4 g/m$^2$.

5th Layer: Gelatin Interlayer

6th Layer: Interlayer

A layer of prefogged silver bromide emulsion containing grains with fogs on the surface thereof and having an average grain size of about 0.15 μm. This layer had a silver coverage of 0.03 g/m$^2$ and a gelatin coverage of 0.4 g/m$^2$.

7th Layer: Slow Speed Green-Sensitive Emulsion Layer

A layer of gold and sulfur sensitized slow speed silver iodobromide emulsion having a silver iodide content of 3 mol % and an average grain size of about 0.3 μm and incorporated with a sensitizing dye: sodium salt of 5,5'-diphenyl-9-ethyl-3,3'-disulfoethylbenzoxacarbocyanine and a magenta coupler emulsion consisting of:

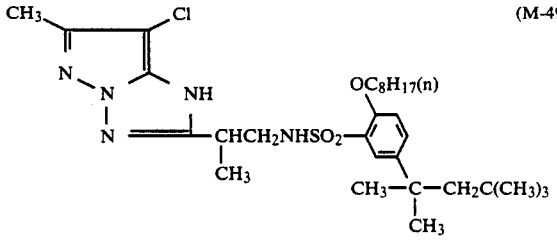

(M-49)

and tri(2-ethylhexyl) phosphate (coupler solvent).

This layer had a silver/coupler ratio of 15.0 and a silver coverage of 0.50 g/m$^2$.

8th Layer: High Speed Green-Sensitive Emulsion Layer

A layer of gold and sulfur sensitized high speed silver iodobromide emulsion having a silver iodide content of 2.6 mol % and an average grain size of about 0.9 μm and incorporated with the same sensitizing dye and magenta coupler emulsion as in the 7th layer described above.

This layer had a silver coverage of 0.30 g/m$^2$.

9th Layer: Gelatin Interlayer

10th Layer: Yellow Filter Layer

A layer of gelatin containing yellow colloidal silver.

11th Layer: Slow Speed Blue-Sensitive Emulsion Layer

A layer of gold and sulfur sensitized silver iodobromide emulsion having a silver iodide content of 4 mol % and an average grain size of about 0.4 μm and incorporated with a yellow coupler emulsion consisting of:

α-(4-pivaloyl)-α-(1-benzyl-5-ethoxy-3-hydantoinyl)-2-chloro-5-dodecyloxycarbonylacetanilide (coupler); and tricresyl phosphate (coupler solvent).

This layer had a silver/coupler ratio of 13.0 and a silver coverage of 0.9 g/m$^2$.

12th Layer: High Speed Blue-Sensitive Emulsion Layer

A layer of gold and sulfur sensitized high speed silver iodobromide emulsion layer having a silver iodide content of 2.6 mol % and an average grain size of about 1.0 μm and incorporated with the same yellow coupler emulsion as in 11th Layer described above.

This layer had a silver coverage of 0.6 g/m$^2$.

13th Layer: Protective Gelatin Layer

Upon coating, each of the above-mentioned layers was additionally incorporated with:

4-hydroxy-6-methyl-1,3,3a,7-tetraazaindene (stabilizer); 1,2-bis(vinylsulfonylacetamido)ethane (hardener); sodium p-dodecylbenzenesulfonate (coating aid); and sodium p-nonylphenoxypoly(ethylenoxy)propanesulfonate (coating aid).

The thus prepared color reversal photographic light-sensitive material (control sample) is designated as Sample 1.

Then, Sample 2 was prepared in the same manner as with Sample 1 except for using Coupler (M-37) of the following structure:

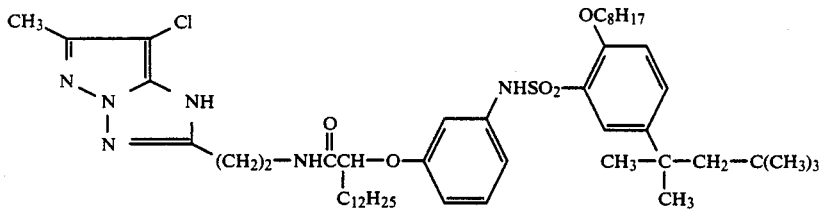

(M-37)

for green-sensitive emulsion layer in place of Coupler (M-49).

Further, a control sample was prepared in absolutely the same manner as with Sample 1 except for changing the coupler in the green-sensitive emulsion layer to 1-(2,4,6-trichlorophenyl)-3-[3-(2,5-di-tertamylphenoxyacetamido)benzamido]-5-pyrazolone and changing the silver/coupler ratio to 30.0 and the coated silver amount to 1.0 g/m$^2$ and 0.60 g/m$^2$ (in 8th Layer). The thus prepared sample was designated as Sample 3.

Another control sample was prepared in absolutely the same manner as with Sample 1 except for using the same coupler as that used in Sample 3 and changing the coupler solvent to di(2-ethylhexyl) phthalate. The thus obtained sample was designated as Sample 4.

Samples 1 to 4 were exposed through an optical wedge fitted with a B-G-R three color filter and then subjected to color reversal processing in accordance with processing prescriptions 1, 2, 3 and 4 of the following:

Processing Prescription 1:
Processing Steps:

| | Time (min) | Temperature (°C.) |
|---|---|---|
| First Development | 6 | 38 |
| Washing | 2 | " |
| Reversal | 2 | " |
| Color Development | 6 | " |
| Compensating | 2 | " |
| Bleaching | 6 | " |
| Fixing | 4 | " |
| Washing | 4 | " |
| Stabilizing | 1 | Ordinary Temperature |
| Drying | | |

For the above processing steps were used the following processing solutions:

| | |
|---|---|
| First Developer: | |
| Water | 700 ml |
| Sodium Tetrapolyphosphate | 2 g |
| Sodium Sulfite | 20 g |
| Hydroquinone.Monosulfonate | 30 g |
| Sodium Carbonate (monohydrate) | 30 g |

-continued

| | |
|---|---|
| 1-Phenyl-4-methyl-4-hydroxymethyl-3-pyrazolidone | 2 g |
| Potassium Bromide | 0.63 g |
| Potassium Thiocyanate | 1.2 g |
| Potassium Iodide (0.1% solution) | 2 ml |
| Water to make | 1,000 ml |
| (pH was adjusted to 10.1) | |
| Reversal Solution: | |
| Water | 700 ml |
| Hexasodium Nitro-N,N,N—trimethylene Phosphate | 3 g |
| Stannous Chloride (dihydrate) | 1 g |
| p-Aminophenol | 0.1 g |
| Sodium Hydroxide | 8 g |
| Glacial Acetic Acid | 15 ml |
| Water to make | 1,000 ml |
| Color Developer: | |
| Water | 700 ml |
| Sodium Tetrapolyphosphate | 2 g |
| Sodium Sulfite | 7 g |
| Sodium Tertiary Phosphate (12 hydrate) | 36 g |
| Potassium Bromide | 1 g |
| Potassium Iodide (0.1% solution) | 90 ml |
| Sodium Hydroxide | 3 g |
| Citrazinic Acid | 15 g |
| N—Ethyl-N—(β-methanesulfonamidoethyl)-3-methyl-4-aminoaniline Sulfate | 11 g |
| Ethylenediamine | 3 g |
| Water to make | 1,000 ml |
| Compensation Solution: | |
| Water | 700 ml |
| Sodium Sulfite | 12 g |
| Sodium Ethylenediaminetetraacetate ($2H_2O$) | 8 g |
| Thioglycerol | 0.4 ml |
| Glacial Acetic Acid | 3 ml |
| Water to make | 1,000 ml |
| Bleaching Solution: | |
| Water | 800 ml |
| Sodium Ethylenediaminetetraacetate ($2H_2O$) | 2 g |
| Iron (III) Ammonium Ethylenediaminetetraacetate ($2H_2O$) | 120 g |
| Potassium Bromide | 100 g |
| Water to make | 1,000 ml |
| Fixing Solution: | |
| Water | 800 ml |
| Ammonium Thiosulfate | 80 g |
| Sodium Sulfite | 5 g |
| Sodium Bisulfate | 5 g |
| Water to make | 1,000 ml |
| Stabilizing Solution: | |
| Water | 800 ml |
| Formalin (37 wt %) | 5 ml |
| Fuji Driwel | 5 ml |
| Water to make | 1,000 ml |

Of the thus prepared samples, Samples 1 and 2 obtained by the combination of the coupler of the present invention and the high-boiling solvent represented by the general formula (II) of the present invention (i.e., the phosphate type oil) provided magenta color images having higher distinctness and higher saturation than that of the magenta color images provided by Control Samples 3 and 4.

The above-described advantages of the samples in accordance with the present invention, which are obtained by removing side absorption on the shorter wavelength side as is seen with pyrazolone couplers and reducing the absorption on the longer wavelength (longer than 600 nm) through combination of the coupler and the phosphate type oil, are useful with respect to color reproduction.

Additionally, when these samples were stored for 1 week under the conditions of 70° C. and 89% RH, the following results were obtained.

TABLE

| Sample | 70° C., 80%, 1 Week*1 | Stain*2 |
|---|---|---|
| 1 | 0.99 | 0.06 |
| 2 | 0.98 | 0.06 |
| 3 | 0.85 | 0.24 |
| 4 | 0.78 | 0.33 |

*1Numerals represent residual densities of portions having an initial density $D_G$ of 0.
*2$D_B$ of highlight portions after storing for 1 week at 70° C. and 80% RH.

These results demonstrate that the combination of the coupler and the phosphate oil in accordance with the present invention is also excellent in preservability of formed color images, and has the merit that acceleration of fading due to remaining coupler and generation of color stain are not caused.

While the invention has been described in detail and with reference to specific embodiments thereof, it will be apparent to one skilled in the art that various changes and modifications can be made therein without departing from the spirit and scope thereof.

What is claimed is:

1. A silver halide color photographic light-sensitive material, which comprises a support having thereon at least one silver halide emulsion layer containing dispersed therein at least one magenta coupler represented by the following general formula (I):

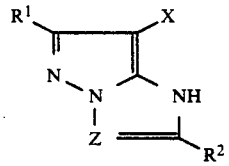

(I)

wherein $R^1$ and $R^2$, which may be the same or different, each represents a hydrogen atom or a substituent, X represents a hydrogen atom or a group capable of being eliminated upon coupling with an oxidation product of an aromatic primary amine developing agent, Z represents a nitrogen atom or $CR_6$ where $R_6$ represents a hydrogen atom or a substituent and the magenta coupler may form a dimer or higher polymer at $R^1$, $R^2$, $R^6$ or X;

together with at least one high boiling organic solvent represented by the following general formula (II):

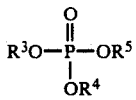

(II)

wherein $R^3$, $R^4$ and $R^5$, which may be the same or different, each represents an alkyl group, a cycloalkyl group, an alkenyl group or an aryl group, provided that the total number of carbon atoms in the groups represented by $R^3$, $R^4$ and $R^5$ is 12 to 60.

2. The light-sensitive material of claim 1, wherein said coupler represented by the general formula (I) is 1H-imidazo[1,2-b]pyrazoles or 1H-pyrazolo-[1,5-b][1,2,4]triazoles.

3. The light-sensitive material of claim 1, wherein said coupler represented by the general formula (I) has the general formula (III) or (IV):

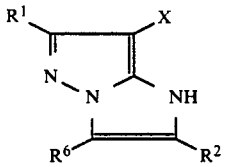

(III)

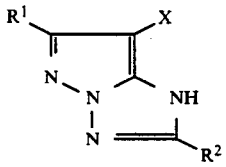

(IV)

wherein $R^1$, $R^2$ and $R^6$, which may be the same or different, each represents a hydrogen atom, a halogen atom, an alkyl group, an aryl group, a heterocyclic group, a cyano group, an alkoxy group, an aryloxy group, a heterocyclic oxy group, an acyloxy group, a carbamoyloxy group, a silyloxy group, a sulfonyloxy group, an acylamino group, an anilino group, a ureido group, an imido group, a sulfamoylamino group, a carbamoylamino group, an alkylthio group, an arylthio group, a heterocyclic thio group, an alkoxycarbonylamino group, an aryloxycarbonylamino group, a sulfonamido group, a carbamoyl group, an acyl group, a sulfamoyl group, a sulfonyl group, a sulfinyl group, an alkoxycarbonyl group, or an aryloxycarbonyl group, and X represents a hydrogen atom, a halogen atom, a carboxy group, or another coupling off group bound to the carbon atom in the coupling position through an oxygen atom, a nitrogen atom or a sulfur atom, or $R^1$, $R^2$, $R^6$ or X also may be a divalent group forming a bis derivative or a bond or a linking group to an ethylenically unsaturated group.

4. The light-sensitive material of claim 3, wherein $R^1$, $R^2$ and $R^6$ each represents a hydrogen atom, a chlorine atom, a bromine atom, a methyl group, a propyl group, a t-butyl group, a trifluoromethyl group, a tridecyl group, a 3-(2,4-di-t-amylphenoxy)propyl group, a 2-dodecyloxyethyl group, a 3-phenoxypropyl group, a 2-hexylsulfonylethyl group, a cyclopentyl group, a benzyl group, a phenyl group, a 4-t-butylphenyl group, a 2,4-di-t-amylphenyl group, a 4-tetradecanamidophenyl group, a 2-furyl group, a 2-thienyl group, a 2-pyrimidinyl group, a 2-benzothiazolyl group, a cyano group, a methoxy group, an ethoxy group, a 2-methoxyethoxy group, a 2-dodecyloxyethoxy group, a 2-methanesulfonylethoxy group, a phenoxy group, a 2-methylphenoxy group, a 4-t-butylphenoxy group, a 2-benzimidazolyloxy group, an acetoxy group, a hexadecanoyloxy group, an N-phenylcarbamoyloxy group, an N-ethylcarbamoyloxy group, a trimethylsilyloxy group, a dodecylsulfonyloxy group, an acetamido group, a benzamido group, a tetradecanamido group, an α-(2,4-di-t-amylphenoxy)butyramido group, a γ- (3-t-butyl-4-hydroxyphenoxy)butyramido group, an α-[4-(4-hydroxyphenylsulfonyl)phenoxy]decanamido group, a phenylamino group, a 2-chloroanilino group, a 2-chloro-5-tetradecanamidoanilino group, a 2-chloro-5-dodecyloxycarbonylanilino group, an N-acetylanilino group, a 2- chloro-5-[α-(3-t-butyl-4-hydroxyphenoxy)-dodecanamido]-anilino group, a phenylureido group, a methylureido group, an N,N-dibutylureido group, an N-succinimido group, a 3-benzylhydantoinyl group, a 4-(2-ethylhexanoylamino)phthalimido group, an N,N-dipropylsulfamoylamino group, an N-methyl-N-decylsulfamoylamino group, a methylthio group, an octylthio group, a tetradecylthio group, a 2-phenoxyethylthio group, a 3-phenoxypropylthio group, a 3-(4-t-butylphenoxy)propylthio group, a phenylthio group, a 2-butoxy-5-t-octylphenylthio group, a 3-pentadecylphenylthio group, a 2-carboxyphenylthio group, a 4-tetradecanamidophenylthio group, a 2-benzothiazolylthio group, a methoxycarbonylamino group, a tetradecyloxycarbonylamino group, a phenoxycarbonylamino group, a 2,4-di-tert-butylphenoxycarbonylamino group, a methanesulfonamido group, a hexadecanesulfonamido group, a benzenesulfonamido group, a p-toluenesulfonamido group, an octadecanesulfonamido group, a 2-methyloxy-5-t-butylbenzenesulfonamido group, an N-ethylcarbamoyl group, an N,N-dibutylcarbamoyl group, an N-(2-dodecyloxyethyl)carbamoyl group, an N-methyl-N-dodecylcarbamoyl group, an N-[3-(2,4-di-tert-amylphenoxy)propyl]carbamoyl group, an acetyl group, a (2,4-di-tert-amylphenoxy)acetyl group, a benzoyl group, an N-ethylsulfamoyl group, an N,N-dipropylsulfamoyl group, an N-(2-dodecyloxyethyl)sulfamoyl group, an N-ethyl-N-dodecylsulfamoyl group, an N,N-diethylsulfamoyl group, a methanesulfonyl group, an octanesulfonyl group, a benzenesulfonyl group, a toluenesulfonyl group, an octanesulfinyl group, a dodecylsulfinyl group, a phenylsulfinyl group, a methoxycarbonyl group, a butyloxycarbonyl group, a dodecylcarbonyl group, an octadecylcarbonyl group, a phenyloxycarbonyl group or a 3-pentadecyloxycarbonyl group, and X represents a hydrogen atom, a chlorine atom, a bromine atom, an iodine atom, a carboxyl group, an acetoxy group, a propanoyloxy group, a benzoyloxy group, a 2,4-dichlorobenzoyloxy group, an ethoxyoxaloyloxy group, a pyruvinyloxy group, a cinnamoyloxy group, a phenoxy group, a 4-cyanophenoxy group, a 4-methanesulfonamidophenoxy group, a 4-methanesulfonylphenoxy group, an α-naphthoxy group, a 3-pentadecylphenoxy group, a benzyloxycarbonyloxy group, an ethoxy group, a 2-cyanethoxy group, a benzyloxy group, a 2-phenethyloxy group, a 2-phenoxyethoxy group, a 5-phenyltetrazolyloxy group, a 2-benzothiazolyloxy group, a benzenesulfonamido group, an N-ethyltoluenesulfonamido group, a heptalfuorobutanamido group, a 2,3,4,5,6-pentafluorobenzamido group, an octanesulfonamido group, a p-cyanophenylureido group, an N,N-diethylsulfamoylamino group, a 1-piperidyl group, a 5,5-dimethyl-2,4-dioxo-3-oxazolidinyl group, a 1-benzylethoxy-3-hydantoinyl group, a 2N-1,1-dioxo-3(2H)-oxo-1,2-benzoisothiazolyl group, a 2-oxo-1,2-dihydro-1-pyridinyl group, an imidazolyl group, a pyrazolyl group, a 3,5-diethyl-1,2,4-triazol-1-yl group, a 5- or 6-bromobenzotriazol-1-yl group, a 5-methyl-1,2,3,4-triazol-1-yl group, a benzimidazolyl group, a 3-benzyl-1-hydantoinyl group, a 1-benzyl-5-hexadecyloxy-3-hydantoinyl group, a 5-methyl-1-tetrazolyl group, a 4-methoxyphenylazo group, a 4-pivaloylaminophenylazo group, a 2-hydroxy-4-propanoylphenylazo group, a phenylthio group, a 2-carboxyphenylthio group, a 2-methoxy-5-t-octylphenylthio group, a 4-methanesulfonylphenylthio group, a 4-octanesulfonamidophenylthio group, a 2-butoxyphenylthio group, a 2-(2-hexanesulfonylethyl)-5-tert-octylphenylthio group, a benzylthio group, a 2-cyanoethylthio group, a 1-ethoxycarbonyltridecylthio group, a 5-phenyl-2,3,4,5-tetrazolylthio group, a 2-benzothiazolylthio group, a 2-dodecylthio-5-thiophenylthio group or a 2-phenyl-3-dodecyl-1,2,4-triazolyl-5-thio group.

5. The light-sensitive material of claim 3, wherein said divalent group is a substituted or unsubstituted alkylene group, a substituted or unsubstituted phenylene group or -NHCOR$_7$CONH- where R$_7$ represents a substituted or unsubstituted alkylene or phenylene group.

6. The light-sensitive material of claim 5, wherein said divalent group is a methylene group, an ethylene group, a 1,10-decylene group, -CH$_2$CH$_2$-O-CH$_2$CH$_2$-, a 1,4-phenylene group, a 1,3-phenylene group,

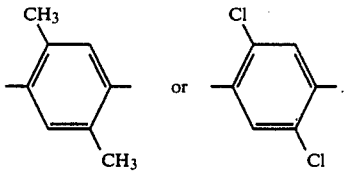

7. The light-sensitive material of claim 3, wherein said linking group represented by R$^1$, R$^2$ or R$^6$ is a substituted or unsubstituted alkylene group, a substituted or unsubstituted phenylene group, -NHCO-, -CONH-, -O-, -OCO- or an aralkylene group.

8. The light-sensitive material of claim 7, wherein said linking group is a methylene group, an ethylene group, a 1,10-decylene group, -CH$_2$CH$_2$OCH$_2$CH$_2$-, a 1,4-phenylene group, a 1,3-phenylene group,

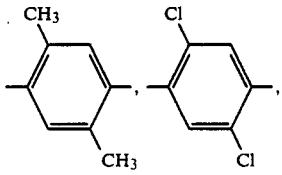

-NHCO-, -CONH-, -O-, -OCO-,

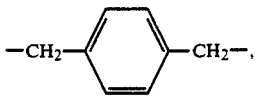

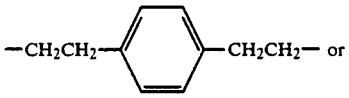

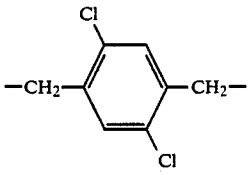

alone or in combination thereof.

9. The light-sensitive material of claim 1, wherein said higher polymer is a homopolymer comprising one or more monomers having the moiety represented by the general formula (I) or a copolymer of at least one monomer having the moiety represented by the general formula (I) with at least one ethylenically unsaturated monomer which does not couple with an oxidation product of an aromatic primary amine developing agent.

10. The light-sensitive material of claim 9, wherein said ethylenically unsaturated monomer is acrylic acid, α-chloroacrylic acid, methacrylic acid, acrylamide, n-butylacrylamide, t-butylacrylamide, diacetoneacrylamide, methacrylamide, methyl acrylate, ethyl acrylate, n-propyl acrylate, n-butyl acrylate, t-butyl acrylate, isobutyl acrylate, 2-ethylhexyl acrylate, n-octyl acrylate, lauryl acrylate, methyl methacrylate, ethyl methacrylate, n-butyl methacrylate, β-hydroxymethacrylate, methylenedibisacrylamide, vinyl acetate, vinyl propionate, vinyl laurate, acrylonitrile, methacrylonitrile, styrene and its derivatives, vinyltoluene, divinylbenzene, vinylacetophenone, sulfostyrene, itaconic acid, citraconic acid, crotonic acid, vinylidene chloride, vinyl ethyl ether, maleic acid, maleic anhydride, maleic esters, N-vinyl-2-pyrrolidone, N-vinylpyridine or 2- or 4-vinylpyridine.

11. The light-sensitive material of claim 1, wherein said coupler represented by the general formula (I) is selected from the group consisting of:

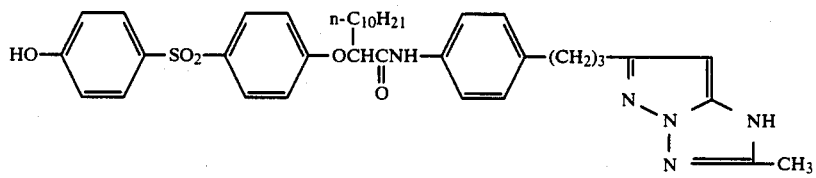
(M-1)

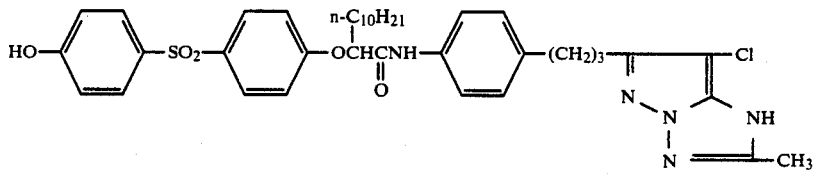
(M-2)

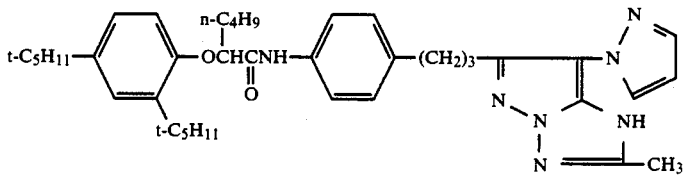
(M-3)

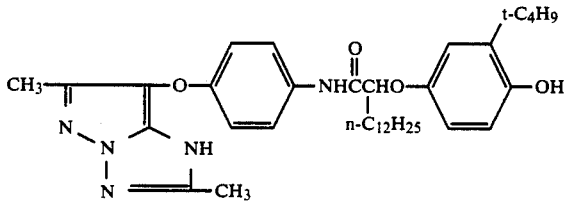
(M-4)

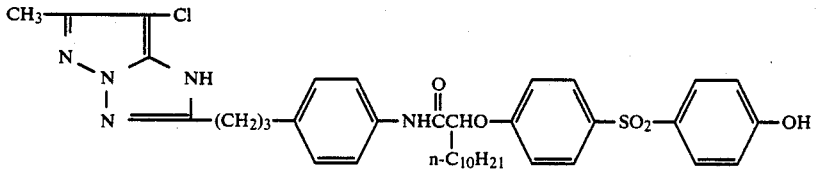
(M-5)

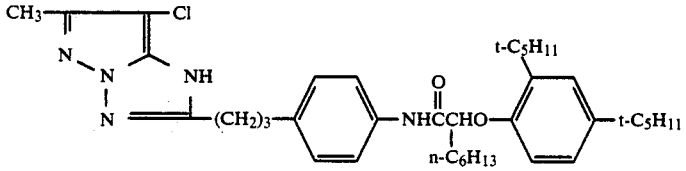
(M-6)

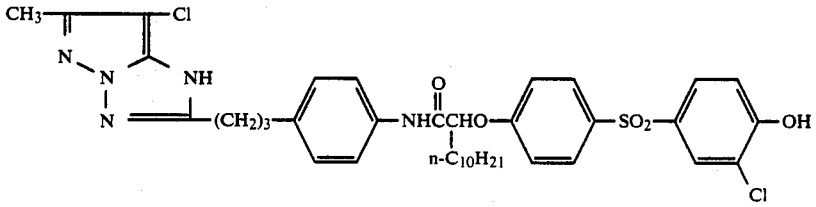
(M-7)

-continued
(M-8)
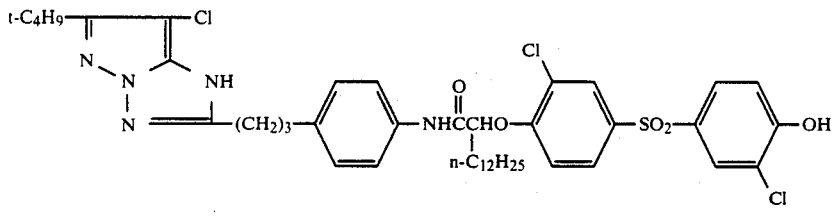
(M-9)
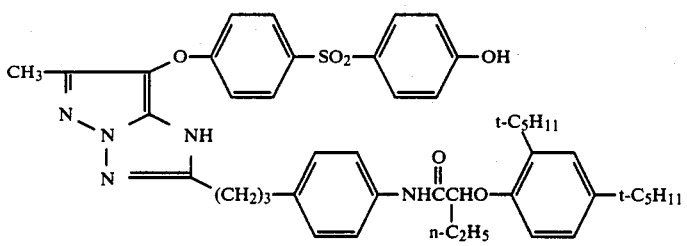
(M-10)
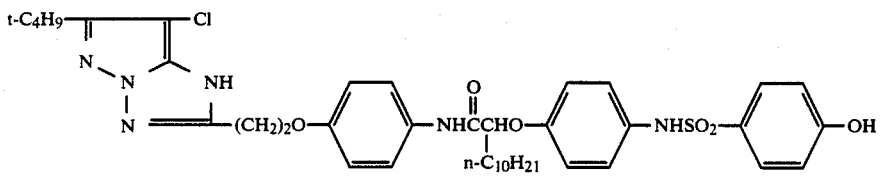
(M-11)
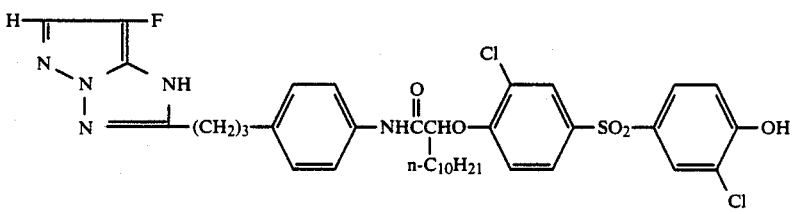
(M-12)
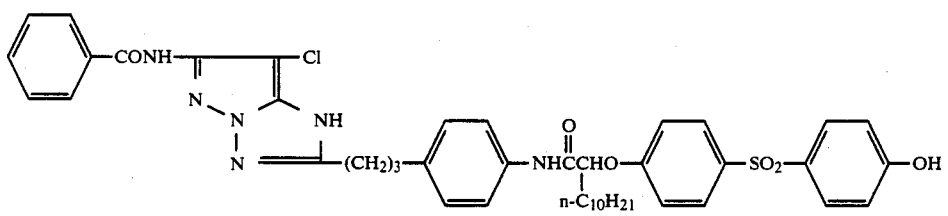
(M-13)
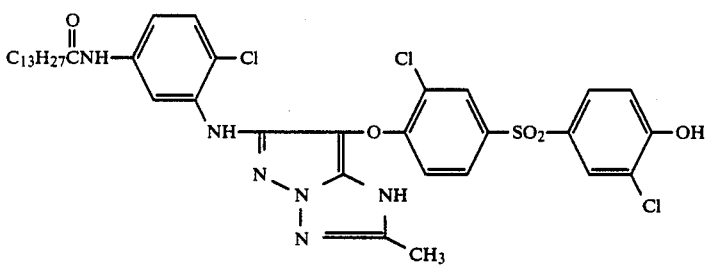
(M-14)
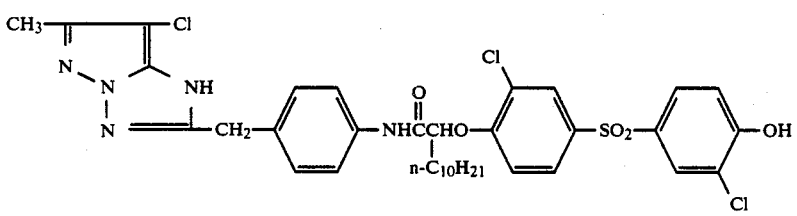

-continued
(M-15)
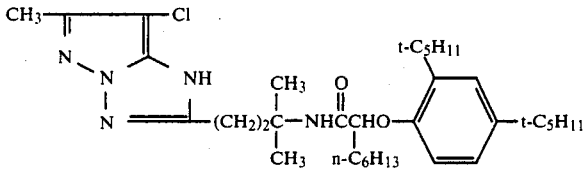
(M-16)
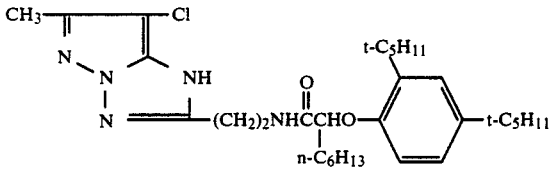
(M-17)
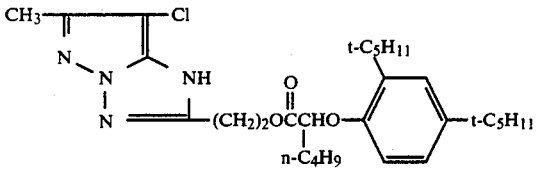
(M-18)
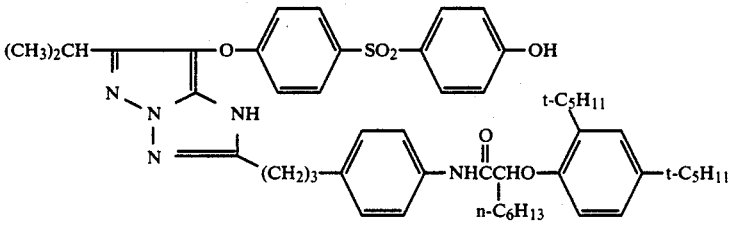
(M-19)
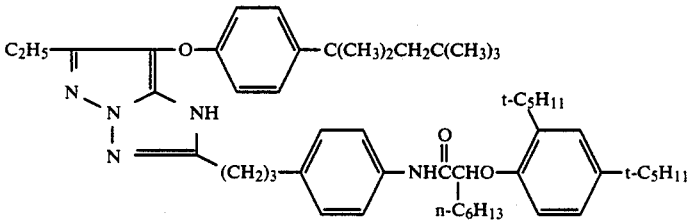
(M-20)
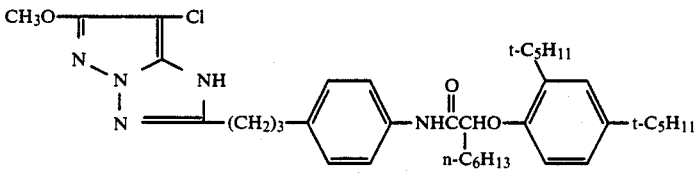
(M-21)
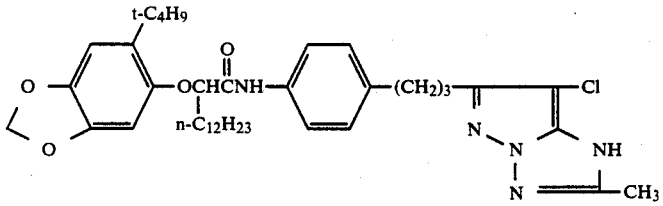
(M-22)
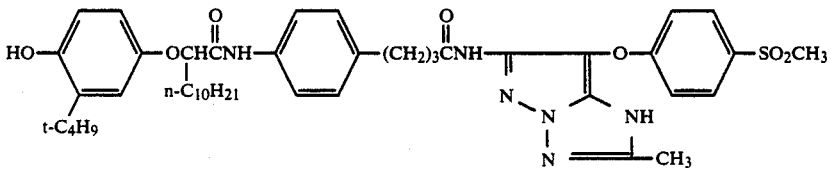

-continued
(M-23)
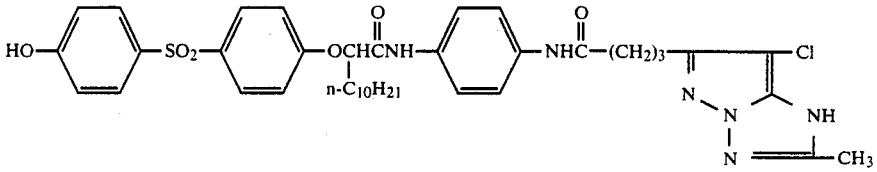
(M-24)
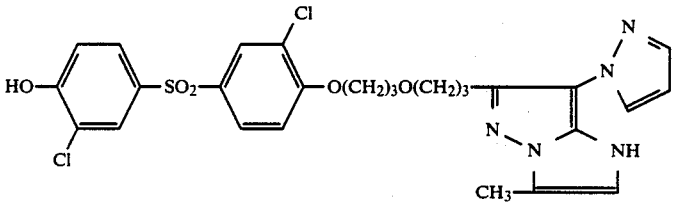
(M-25)
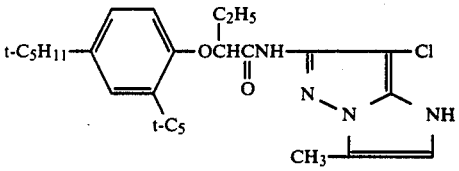
(M-26)
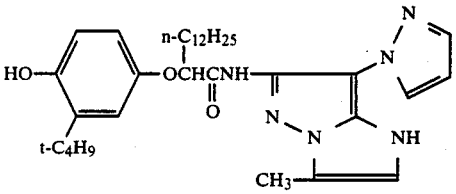
(M-27)
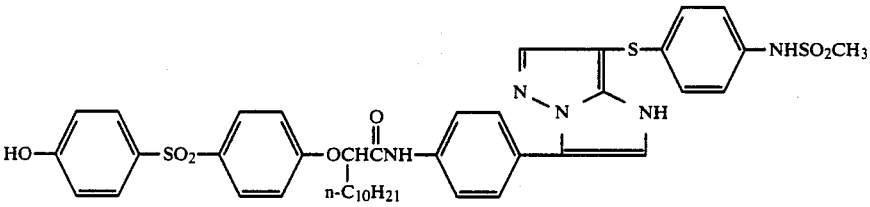
(M-28)
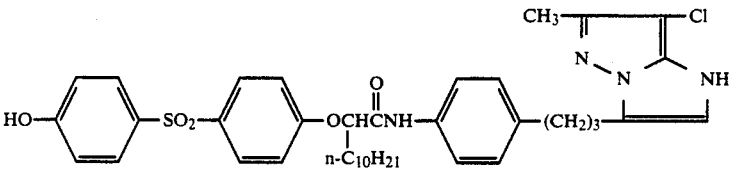
(M-29)
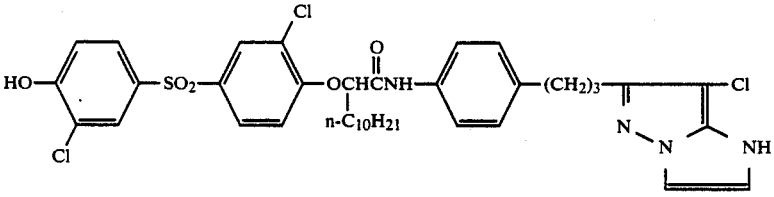
(M-30)
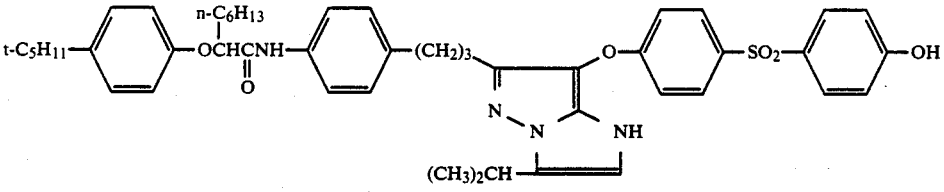

-continued
(M-31)
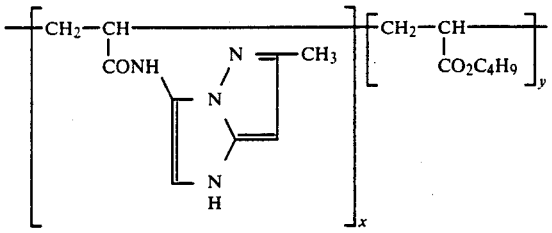
x:y = 50:50
(by weight, hereinafter the same)
(M-32)
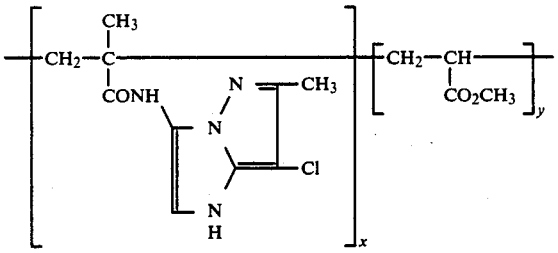
x:y = 40:60
(M-33)
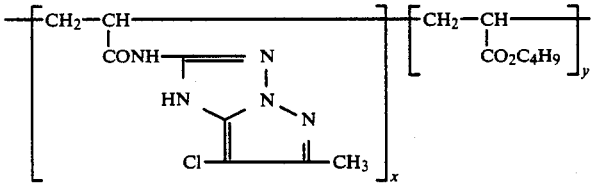
x:y = 50:50
(M-34)
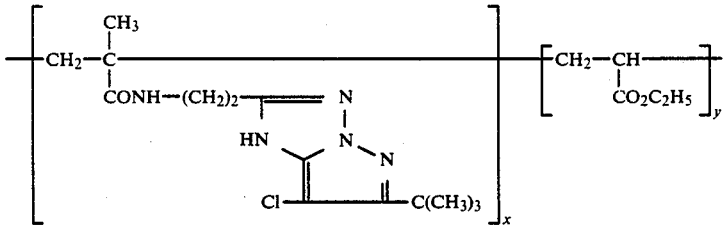
x:y = 55:45
(M-35)
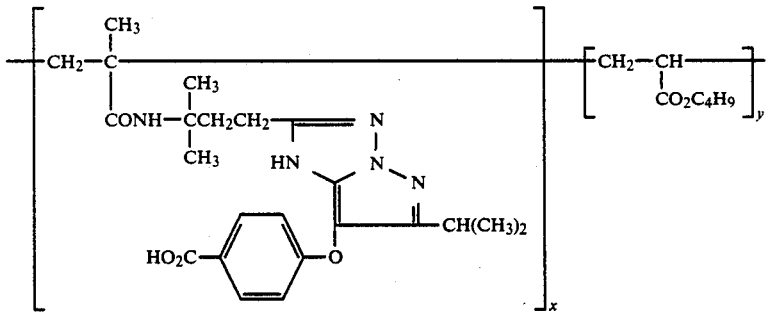
x:y = 50:50

-continued
(M-36)
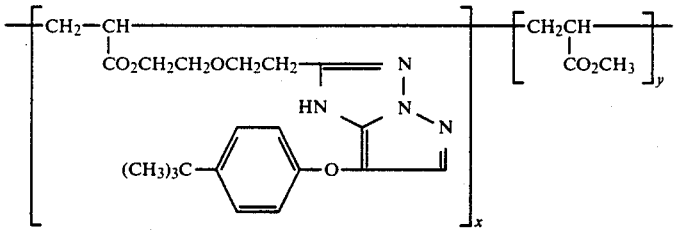
x:y = 45:55
(M-37)
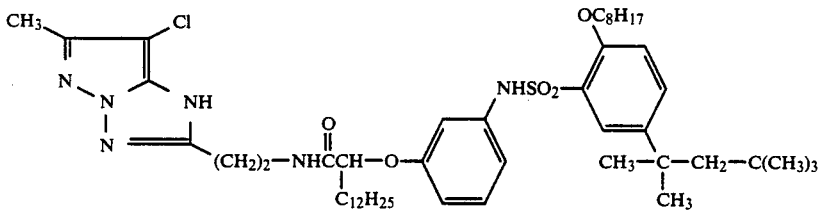
(M-38)
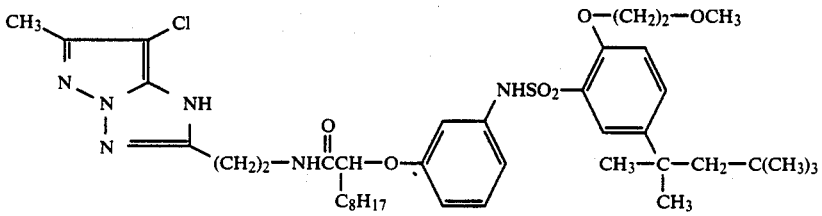
(M-39)
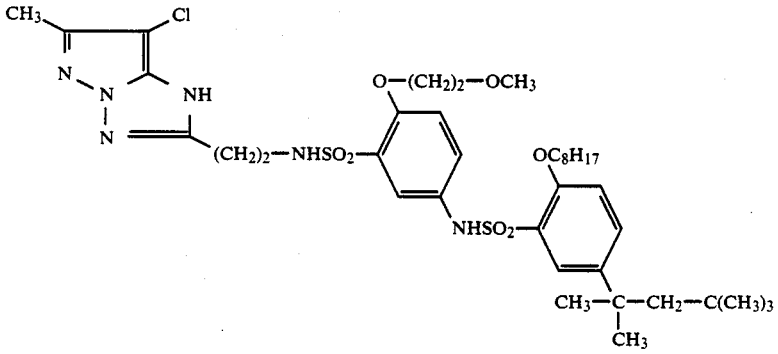
(M-40)
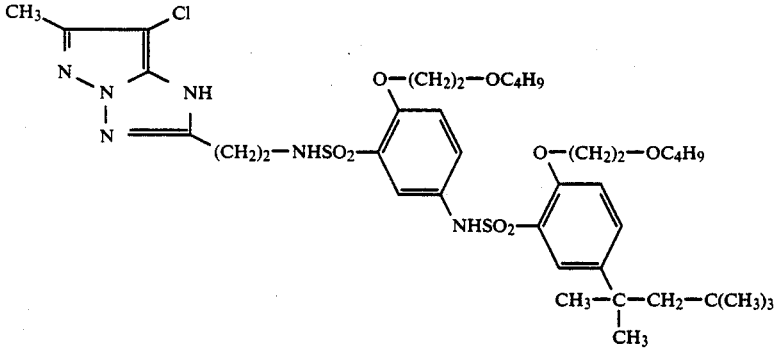

-continued
(M-41)
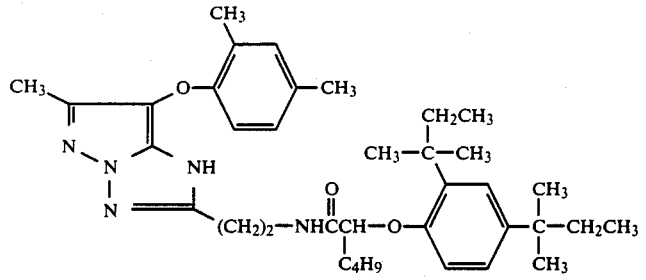
(M-42)
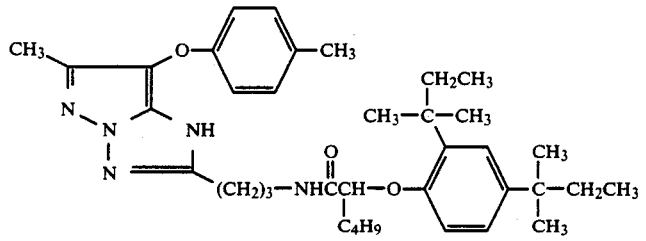
(M-43)
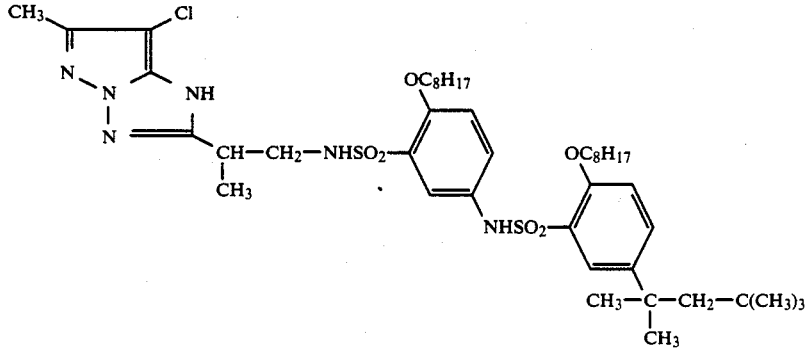
(M-44)
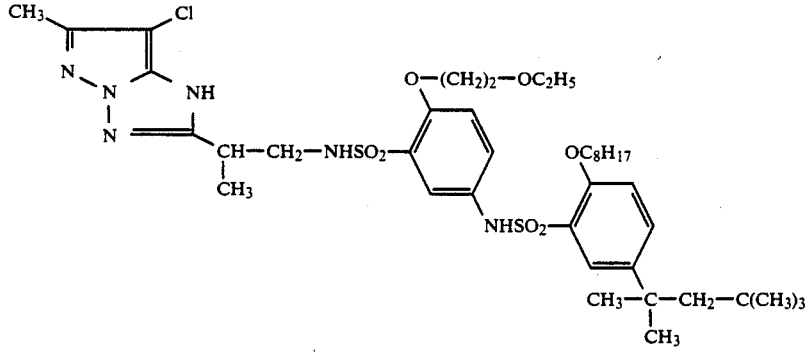
(M-45)
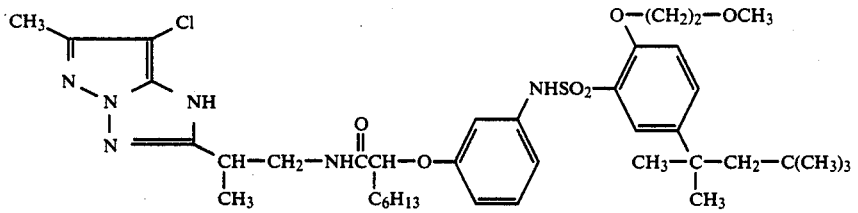

-continued
(M-46)
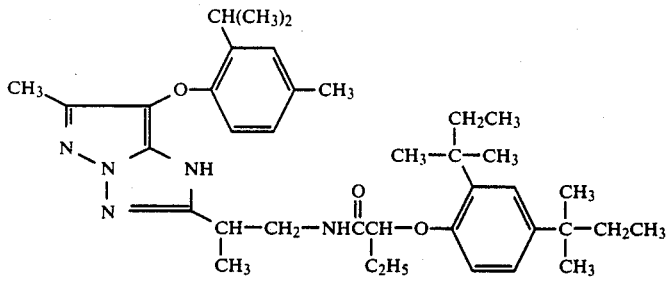
(M-47)
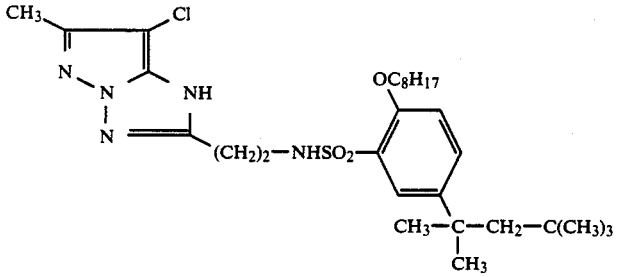
(M-48)
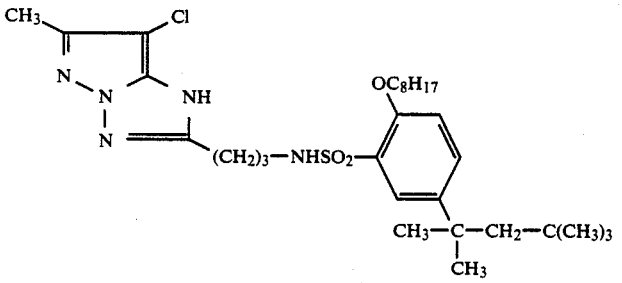
(M-49)
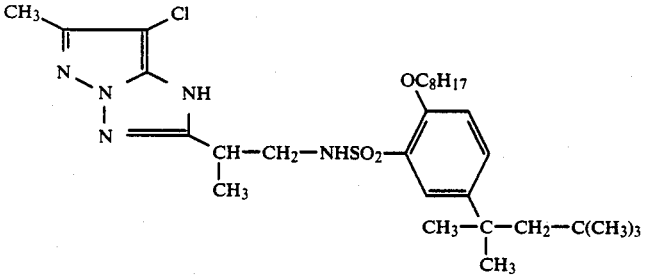
(M-50)
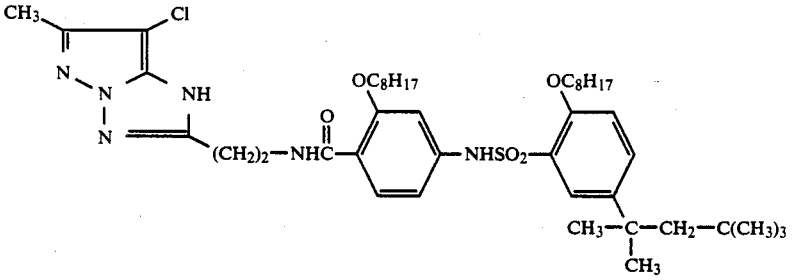

-continued (M-51)

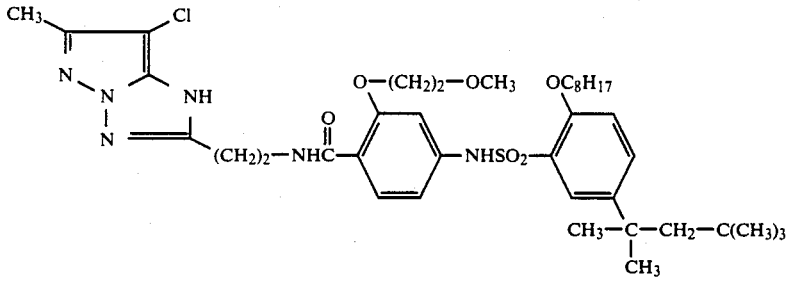

12. The light-sensitive material of claim 1, wherein said solvent represented by the general formula (II) has a boiling point of about 175° C. or above at atmospheric pressure.

13. The light-sensitive material of claim 1, wherein said alkyl group, cycloalkyl group and alkenyl group represented by $R^3$, $R^4$ and $R^5$ are each substituted with at least one of a halogen atom, an alkoxy group, an aryl group, an aryloxy group, an alkenyl group and an alkoxycarbonyl group.

14. The light-sensitive material of claim 1, wherein said aryl group represented by $R^3$, $R^4$ and $R^5$ is substituted with at least one of a halogen atom, an alkoxy group, an aryloxy group, an alkenyl group, an alkoxycarbonyl group or an alkyl gorup.

15. The light-sensitive material of claim 1, wherein $R^3$, $R^4$ and $R^5$, which may be the same or different, each represents a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an eicosyl group, a 2-ethylhexyl group, a 7-methyloctyl group, a cyclopentyl group, a cyclohexyl group, a butenyl group, a pentenyl group, a hexenyl group, a heptenyl group, an octenyl group, a decenyl group, a dodecenyl group, an octadecenyl group, or these groups substituted with at least one of a fluorine atom, a chlorine atom, a methoxy group, an ethoxy group, a butoxy group, a phenyl group, a tolyl group, a naphthyl group, or a phenoxy group.

16. The light-sensitive material of claim 1, wherein $R^3$, $R^4$ and $R^5$, which may be the same or different, each represents a phenyl group, a naphthyl group, a tolyl group or, these groups substituted with at least one of a fluorine atom, a chlorine atom, a methoxy group, an ethoxy group, a butoxy group, a phenoxy group or an alkyl group.

17. The light-sensitive material of claim 1, wherein $R^3$, $R^4$ and $R^5$, which may be the same or different, each represents a tolyl group, a 2-ethylhexyl group, a 7-methyloctyl group, a cyclohexyl group or a straight chain alkyl group containing 8 to 18 carbon atoms.

18. The light-sensitive material of claim 1, wherein said solvent represented by the general formula (II) is selected from the group consisting of:

$O{=}P(OC_4H_9{-}n)_3$ (S-1)

$O{=}P(OCH_2CH_2CH(CH_3)CH_3)_3$ (S-2)

$O{=}P(OC_6H_{13}{-}n)_3$ (S-3)

-continued (S-4)

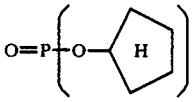

(S-5)

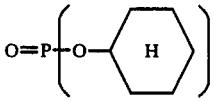

$O{=}P(OC_8H_{17}{-}n)_3$ (S-6)

(S-7)

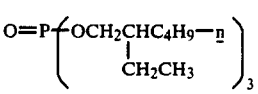

(S-8)

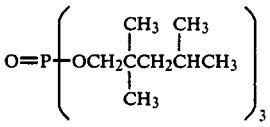

(S-9)

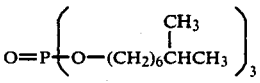

$O{=}P(OC_9H_{19}{-}n)_3$ (S-10)

(S-11)

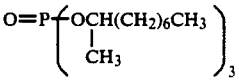

$O{=}P(OC_{10}H_{21}{-}n)_3$ (S-12)

(S-13)

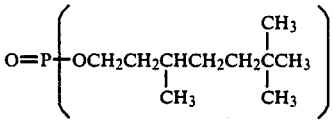

(S-14)

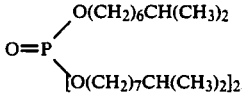

(S-15)

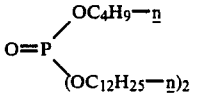

$O{=}P(OC_{12}H_{25}{-}n)_3$ (S-16)

-continued (S-17)

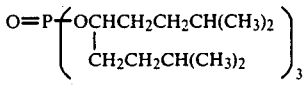

(S-18)

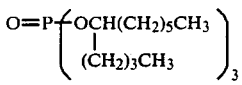

(S-19)

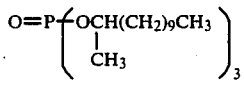

(S-20) $O{=}P(OC_{14}H_{29}{-}\underline{n})_3$ (S-21) $O{=}P(OC_{15}H_{31}{-}\underline{n})_3$ (S-22) $O{=}P(OC_{16}H_{33}{-}\underline{n})_3$ (S-23) $O{=}P(OCH{=}CHC_{16}H_{33})_3$ (S-24)

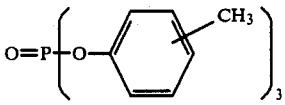

-continued (S-25)

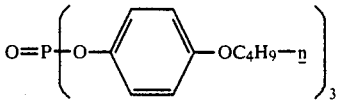

(S-26)

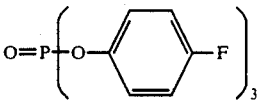

(S-27)

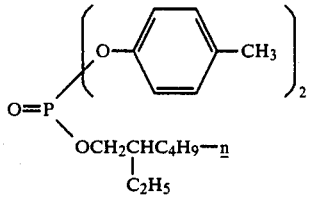

19. The light-sensitive material of claim 1, wherein said solvent represented by the general formula (II) is used in combination with other high boiling organic solvent selected from phthalate type solvents, amide type solvents, fatty acid ester type solvents, benzoate type solvents or phenolic solvents

20. The light-sensitive material of claim 1, wherein the ratio of said solvent represented by the general formula (II) to said coupler represented by the general formula (I) is about 0.05:1 to about 20:1 by weight.

* * * * *